(12) United States Patent
Ham et al.

(10) Patent No.: US 12,489,725 B2
(45) Date of Patent: Dec. 2, 2025

(54) ELECTRONIC DEVICE PROVIDING NOTIFICATION AND METHOD FOR OPERATING THE SAME

(71) Applicant: Samsung Electronics Co., Ltd., Suwon-si (KR)

(72) Inventors: Yookyung Ham, Suwon-si (KR); Jaeho Ko, Suwon-si (KR); Hyesoo Kim, Suwon-si (KR); Hyeyoung Moon, Suwon-si (KR); Hyewon Park, Suwon-si (KR); Hyeonseung Lee, Suwon-si (KR); Sungchan Bae, Suwon-si (KR); Seungyong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 155 days.

(21) Appl. No.: 17/947,621

(22) Filed: Sep. 19, 2022

(65) Prior Publication Data

US 2023/0164103 A1 May 25, 2023

Related U.S. Application Data

(63) Continuation of application No. PCT/KR2022/012055, filed on Aug. 11, 2022.

(30) Foreign Application Priority Data

Nov. 23, 2021 (KR) .................. 10-2021-0162386
Jan. 12, 2022 (KR) .................. 10-2022-0004519

(51) Int. Cl.
*H04L 51/224* (2022.01)
*G06F 3/0482* (2013.01)
*H04L 51/222* (2022.01)

(52) U.S. Cl.
CPC .......... *H04L 51/224* (2022.05); *G06F 3/0482* (2013.01); *H04L 51/222* (2022.05)

(58) Field of Classification Search
CPC .. G06F 3/0482; G06F 3/04847; G06F 3/0488; H04L 51/222; H04L 51/224
See application file for complete search history.

(56) References Cited

U.S. PATENT DOCUMENTS 9,196,148 B1 * 11/2015 Hutz .................. G08B 25/005
9,307,033 B1    4/2016 Meschkat
(Continued)

FOREIGN PATENT DOCUMENTS

KR    10-2005-0040199 A    5/2005
KR    10-2005-0045465 A    5/2005
(Continued)

OTHER PUBLICATIONS

International Search report dated Nov. 17, 2022, issued in International Patent Application No. PCT /KR2022/012055.
(Continued)

*Primary Examiner* — Greg C Bengzon
(74) *Attorney, Agent, or Firm* — Jefferson IP Law, LLP

(57) ABSTRACT

According to various embodiments, an electronic device may comprise a display and a processor, wherein the processor may be configured to control the display to display a first object for setting a first condition to provide a notification and a second object for setting a second condition to provide the notification, perform at least one of setting the first condition based on a first input obtained through the first object or setting the second condition based on a second input obtained through the second object, and determine a plurality of first time sections using the first condition, based on the first condition and the second condition being set. Various other embodiments may be possible as well.

21 Claims, 21 Drawing Sheets

(56) References Cited

U.S. PATENT DOCUMENTS

| | | | |
|---|---|---|---|
| 9,514,447 B2* | 12/2016 | Plapp | G06F 16/54 |
| 10,417,613 B1* | 9/2019 | Brisebois | G06F 21/554 |
| 10,490,033 B1* | 11/2019 | Lemberger | G08B 13/00 |
| 10,546,485 B1* | 1/2020 | Hutz | G08B 21/0423 |
| 10,956,690 B1* | 3/2021 | Sutton | G06K 7/10366 |
| 11,887,164 B2* | 1/2024 | Priness | G06Q 30/0264 |
| 2005/0227625 A1* | 10/2005 | Diener | H04B 17/23 |
| | | | 455/67.11 |
| 2009/0315705 A1 | 12/2009 | Kim et al. | |
| 2013/0250739 A1 | 9/2013 | Lee | |
| 2014/0059487 A1* | 2/2014 | Baumann | G06Q 10/109 |
| | | | 715/811 |
| 2014/0278057 A1 | 9/2014 | Berns | |
| 2016/0014564 A1* | 1/2016 | Del Vecchio | H04W 4/023 |
| | | | 455/456.2 |
| 2016/0309022 A1* | 10/2016 | Herman | H04M 3/436 |
| 2016/0309310 A1* | 10/2016 | Herman | H04W 68/005 |
| 2016/0345132 A1 | 11/2016 | Creighton et al. | |
| 2016/0350812 A1 | 12/2016 | Priness | |
| 2018/0113577 A1* | 4/2018 | Burns | G11B 27/3081 |
| 2018/0115788 A1* | 4/2018 | Burns | G06V 20/41 |
| 2018/0174108 A1 | 6/2018 | Kang et al. | |
| 2019/0171463 A1* | 6/2019 | Energin | G06F 3/013 |
| 2019/0206225 A1 | 7/2019 | Adler et al. | |
| 2019/0342447 A1* | 11/2019 | Ko | H04M 1/7243 |
| 2019/0391537 A1* | 12/2019 | Flores | G16H 20/70 |
| 2023/0169547 A1* | 6/2023 | Gross | H04L 67/12 |
| | | | 705/329 |
| 2023/0403509 A1* | 12/2023 | Carrigan | G06F 3/04886 |

FOREIGN PATENT DOCUMENTS

| | | |
|---|---|---|
| KR | 10-2006-0062440 A | 6/2006 |
| KR | 10-2009-0131831 A | 12/2009 |
| KR | 10-1070362 B1 | 10/2011 |
| KR | 10-2015-0127783 A | 11/2015 |
| KR | 10-1624457 B1 | 5/2016 |
| KR | 10-2017-0095528 A | 8/2017 |

OTHER PUBLICATIONS

European Search Report dated Oct. 7, 2024, issued in European Application No. 22898765.7.

* cited by examiner

ELECTRONIC DEVICE PROVIDING NOTIFICATION AND METHOD FOR OPERATING THE SAME

CROSS-REFERENCE TO RELATED APPLICATION(S)

This application is a continuation application, claiming priority under § 365(c), of an International application No. PCT/KR2022/012055, filed on Aug. 11, 2022, which is based on and claims the benefit of a Korean patent application number 10-2021-0162386, filed on Nov. 23, 2021, in the Korean Intellectual Property Office, and of a Korean patent application number 10-2022-0004519, filed on Jan. 12, 2022, in the Korean Intellectual Property Office, the disclosure of each of which is incorporated by reference herein in its entirety.

TECHNICAL FIELD

The disclosure relates to an electronic device providing a notification and a method for operating the same.

BACKGROUND ART

The electronic device may provide a schedule management application, and the user may efficiently manage the user's schedule by the schedule management application. The schedule management application provided by the electronic device may include a function of providing a notification to the user when a designated condition is met, and the user's scheduling efficiency may be increased according to how efficiently the notification may be provided.

The above information is presented as background information only to assist with an understanding of the disclosure. No determination has been made, and no assertion is made, as to whether any of the above might be applicable as prior art with regard to the disclosure.

DISCLOSURE

Technical Problem

If the electronic device provides a notification only when a specific time is met or a notification is provided only when a specific location is met, unnecessary notifications may be provided to the user who wants to receive notifications when both the specific time and the specific location are met.

Aspects of the disclosure are to address at least the above-mentioned problems and/or disadvantages and to provide at least the advantages described below. Accordingly, an aspect of the disclosure is to provide an electronic device and an operation method thereof that provides a notification when both a condition related to time and a condition related to location are met, determines a time section during which a notification may be provided based on setting at least one condition related to providing a notification, and if a specific condition within the determined time section is met, provides a notification.

Additional aspects will be set forth in part in the description which follows and, in part, will be apparent from the description, or may be learned by practice of the presented embodiments.

Technical Solution

In accordance with an aspect of the disclosure, an electronic device comprising a display and a processor is provided., The processor may be configured to control the display to display a first object for setting a first condition to provide a notification and a second object for setting a second condition to provide the notification, perform at least one of setting the first condition based on a first input obtained through the first object or setting the second condition based on a second input obtained through the second object, and determine a plurality of first time sections using the first condition, based on the first condition and the second condition being set.

In accordance with an aspect of the disclosure, a method for operating an electronic device is provided. The method may comprise controlling a display of the electronic device to display a first object for setting a first condition to provide a notification and a second object for setting a second condition to provide the notification, performing at least one of setting the first condition based on a first input obtained through the first object or setting the second condition based on a second input obtained through the second object, and determining a plurality of first time sections using the first condition, based on the first condition and the second condition being set.

Advantageous Effects

According to various embodiments, there may be provided an electronic device and operation method thereof, which may increase the user's scheduling efficiency by providing a notification considering at least one of time or location. According to various embodiments, there may be provided an electronic device and operation method thereof, which may increase the user's scheduling efficiency by providing the user with a time section designed to be suitable for the user considering ambient context information and the user's behavior pattern in determining a time section for providing a notification.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
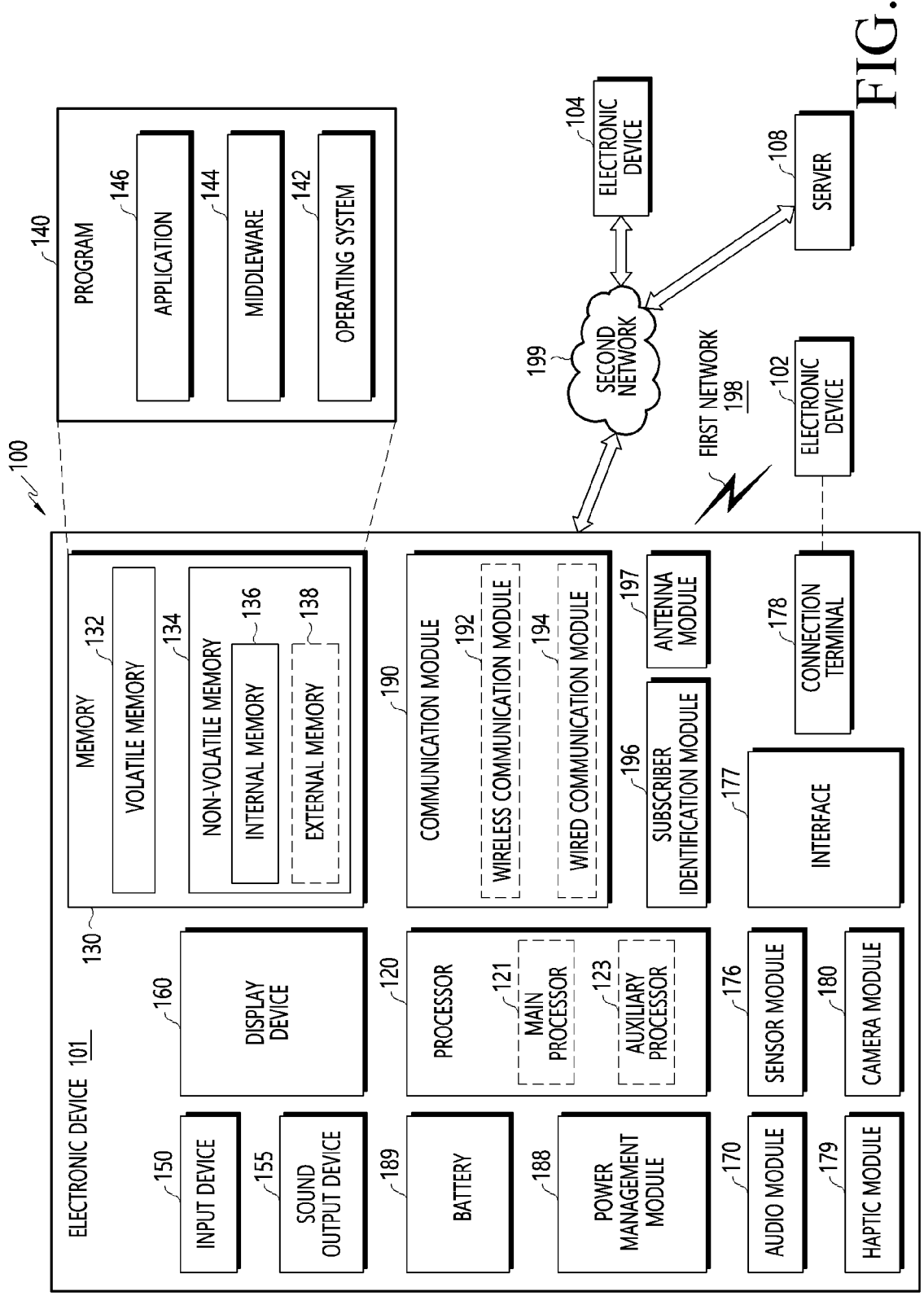
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device). According to an embodiment, the antenna module may include an antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
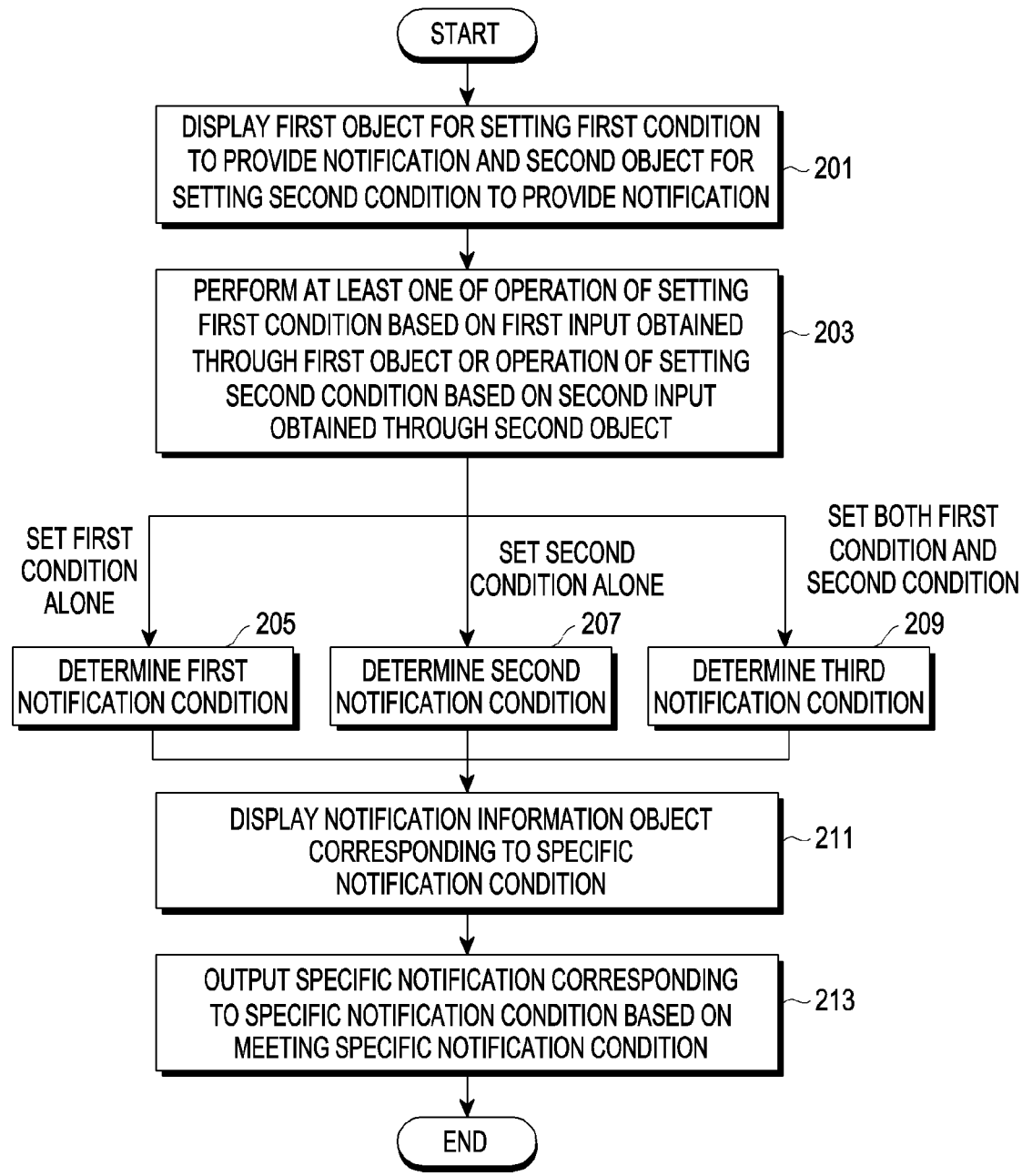
FIG. 2 is a flowchart illustrating an operation method of an electronic device according to an embodiment of the disclosure.

FIG. 2 is a flowchart illustrating an operation method of an electronic device (e.g., the electronic device 101 of FIG. 1) according to an embodiment of the disclosure.

Figure 3A:
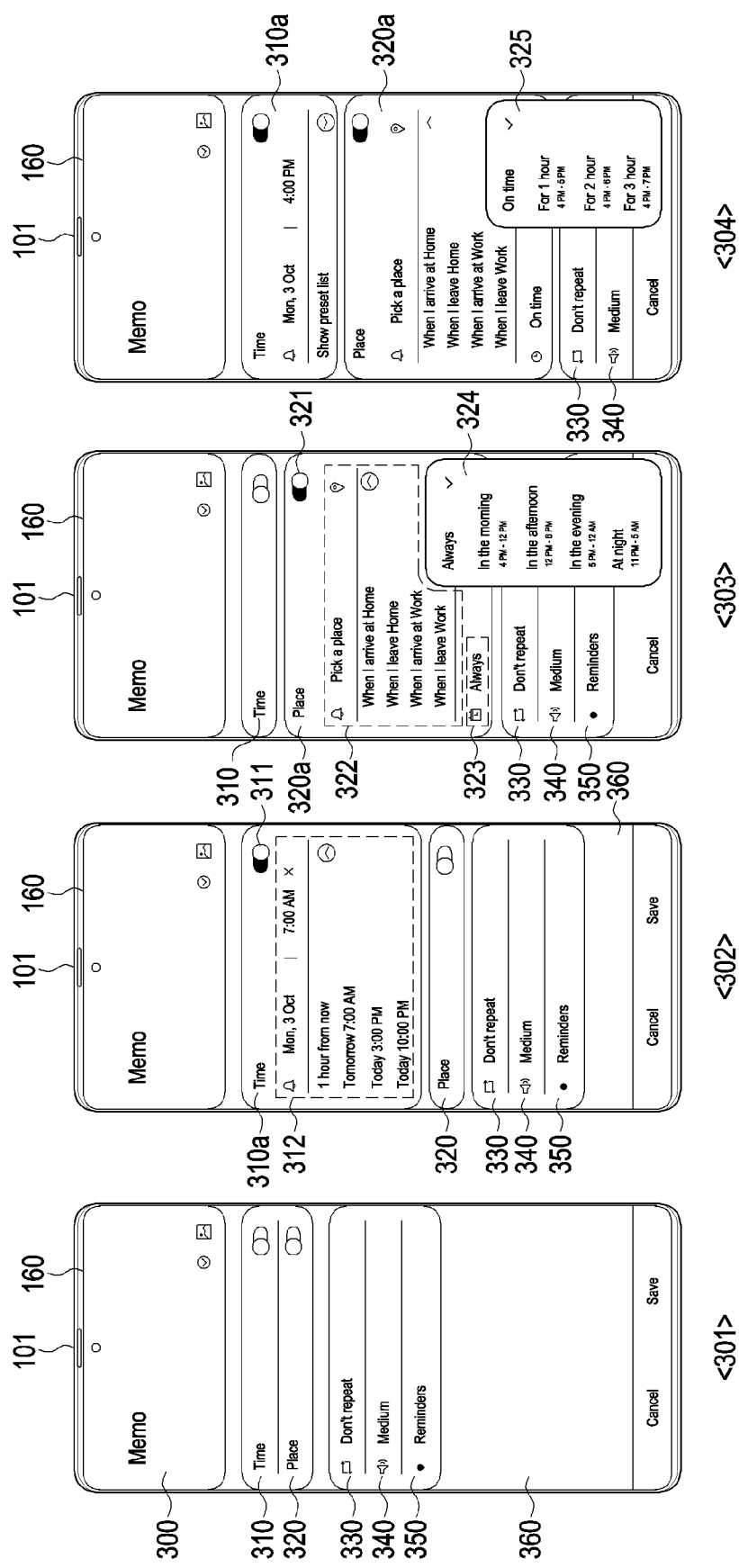
FIG. 3A is a view illustrating an operation in which an electronic device sets a notification condition according to an embodiment of the disclosure.

FIG. 3A is a view illustrating an operation in which an electronic device 101 sets a notification condition according to an embodiment of the disclosure.

Figure 3B:
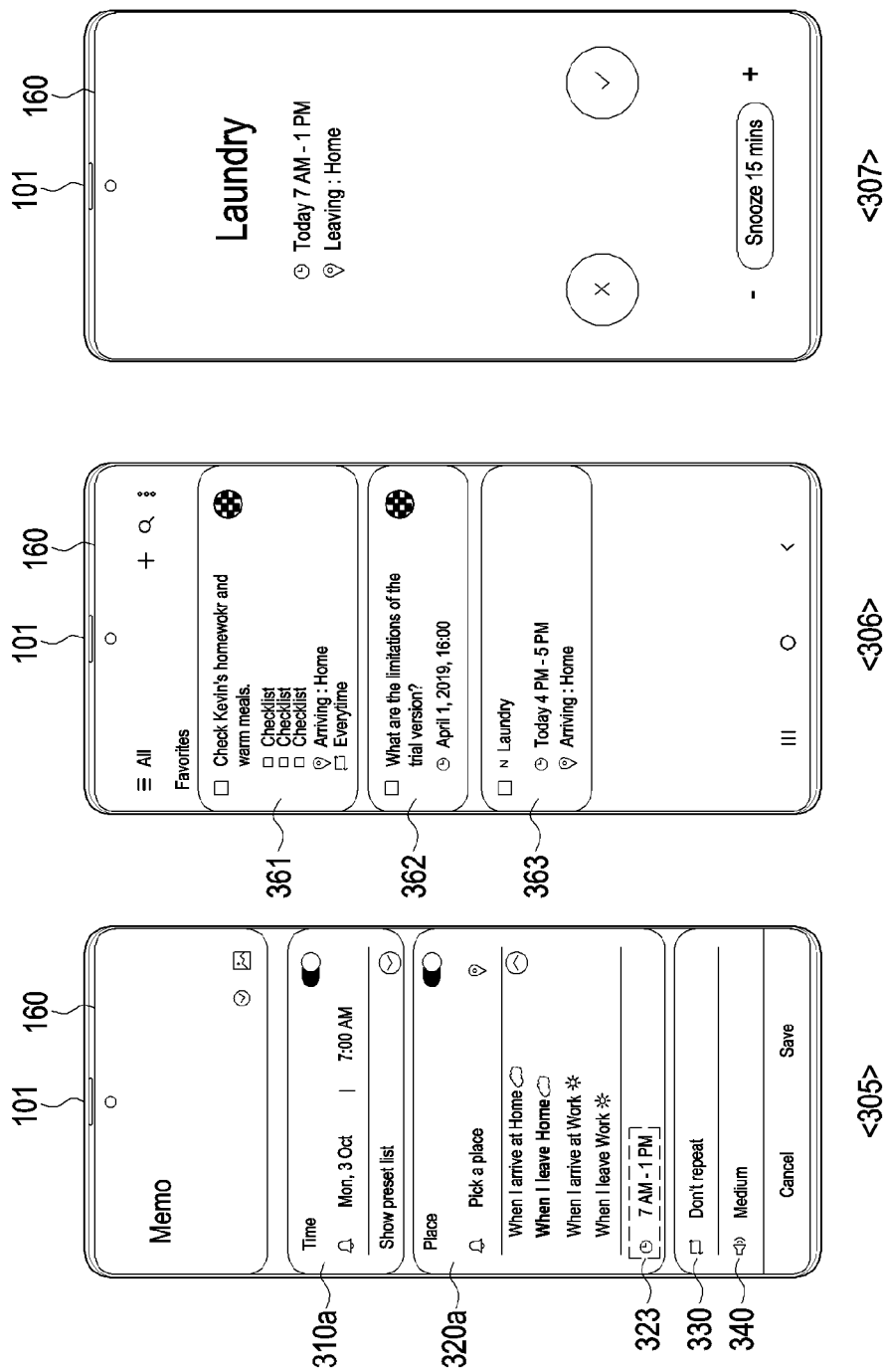
FIG. 3B is a view illustrating an operation in which an electronic device sets a notification condition and provides a notification according to an embodiment of the disclosure.

FIG. 3B is a view illustrating an operation in which an electronic device 101 sets a notification condition and provides a notification according to an embodiment of the disclosure.

Referring to FIGS. 2, 3A and 3B, in operation 201, according to various embodiments, the electronic device 101 (e.g., the processor 120 of FIG. 1) may control the display (e.g., the display module 160 of FIG. 1) to display a first object for setting a first condition to provide a notification and a second object for setting a second condition to provide a notification. For example, the first condition may be a time condition, and the second condition may be a location condition, but it will be appreciated by one of ordinary skill in the art that the type is not limited. For example, referring to <301> of FIG. 3A, the electronic device 101 may control the display module 160 to display a notification setting screen 360 including a first object 310 for setting a first condition (e.g., time condition) and a second object 320 for setting a second condition (e.g., location condition). Each of the first object 310 and the second object 320 may include, e.g., a toggle button capable of toggling. While the toggle button is disposed in a first position (e.g., a relatively left position), the function corresponding to the object may be deactivated and, while the toggle button is disposed in a second position (e.g., a relatively right position), the function corresponding to the object may be activated. The position of the toggle button may be changed based on the user's input (e.g., touch, drag, or flick gesture), but is not limited thereto. Further, activation/deactivation based on toggling is merely an example, and the setting scheme is not limited. For example, referring to <301> of FIG. 3A, the notification setting screen 360 may further include an object 300 for obtaining and/or displaying a memo related to notification, an object 330 for setting the number of repetitions or the number of times of outputting the notification, an object 340 for setting the intensity of outputting the notification, and an object 350 for setting the group to which the notification is to belong, but the type of objects is not limited.

In operation 203, according to various embodiments, the electronic device 101 (e.g., the processor 120 of FIG. 1) may perform at least one of the operation of setting a first condition based on a first input obtained through the first object 310 or the operation of setting a second condition based on a second input obtained through the second object 320.

According to an embodiment, the electronic device 101 may activate the first condition. The operation of activating the first condition is an operation for setting the first condition, and may include an operation for activating the first object 310. Here, activation of the first condition may mean switching (or entering) into a state in which information for configuring the first condition may be input. Deactivation of the first condition may mean switching (or entering) into a state in which information for configuring the first condition may not be input. The event (or trigger) for activation and/or deactivation of the first condition is not limited. For example, referring to <302> of FIG. 3A, when the electronic device 101 obtains a user input (e.g., tap) to the button 311 (e.g., a toggle button), the electronic device 101 may activate the first object 310 (or function corresponding to the first object 310) as the operation of activating the first condition. It will be appreciated by one of ordinary skill in the art that activation of an object (or activation of the function corresponding to the object) in the disclosure may be understood as activation of a condition corresponding to the object. The operation of activating the first object 310 may mean the operation of switching into a state in which the first condition may be set to control the notification for the first condition (e.g., time condition) and may include the operation of displaying an activated first object 310a which has a relatively enlarged size, capable of inputting and/or displaying corresponding input through at least one item. As the first object 310 is extended, the positions of the remaining objects 320, 330, 340, and 350 may be moved relatively downward, but this is an example. For example, referring to <302> of FIG. 3A, the activated first object 310a may be displayed to be extended to include a first selection item 312 for setting the first condition (e.g., time condition). According to an embodiment, the electronic device 101 may obtain a first input for setting the first condition through the activated first object 310a. For example, referring to <302> of FIG. 3A, the electronic device 101 may obtain a first user interaction for inputting or selecting a specific time (e.g., 7:00 AM October 3) through the first selection item 312, as the first input, or obtain a second user interaction for selecting one from a list including at least one times, as the first time. Referring to, e.g., <302> of FIG. 3A, the list including the at least one times may include at least one of a predetermined time (e.g., one hour after the present), a time (e.g., 7:00 AM tomorrow) resultant from applying the existing time (e.g., time selected a predetermined number of times) (e.g., 3:00 PM or 7:00 AM) determined based on the result of analysis of a user input history, a time (e.g., 3:00 PM today) resultant from applying a time determined according to priority based on the number of selections to a predetermined date, or a time which is a predetermined period (e.g., one hour) after a specific time determined based on the first user interaction, and the time included in the list may be changed by the user's setting, but the setting condition is not limited. According to an embodiment, in response to obtaining the first input, the electronic device 101 may set a first condition regarding a specific time. According to an embodiment, the electronic device 101 may deactivate the first object 310 based on the user input. For example, referring to <302> of FIG. 3A, the electronic device 101 may deactivate the first object 310 upon obtaining a user input (e.g., tap) to the button 311 (e.g., toggle button) indicating the activation state of the first object 310. The operation of deactivating the first object 310 may mean the operation of switching into a state in which the first condition (e.g., time condition) may not be set and may include the operation of displaying a relatively shrunken first object 310 in which the first selection item 312 being displayed is hidden. As an element used to activate or deactivate the first object 310, the button 311 is merely an example, but without limitations thereto, various elements may be used to activate or deactivate the first object 310.

According to an embodiment, after activating the second object 320, the electronic device 101 may obtain a second input for setting the second condition through the activated second object 320a. According to an embodiment, the electronic device 101 may activate the second condition. The operation of activating the second condition is an operation for setting the second condition, and may include an operation for activating the second object 320. For example, referring to <303> of FIG. 3A, when the electronic device 101 obtains a user input (e.g., tap) to the button 321 (e.g., a toggle button), the electronic device 101 may activate the second object 320 (or function corresponding to the second object 320) as the operation of activating the second condition. The operation of activating the second object 320 may mean the operation of switching into a state in which the second condition may be set to control the notification for the second condition (e.g., location condition) and may include the operation of displaying an activated second object 320*a* which has a relatively enlarged size, capable of inputting and/or displaying corresponding input through at least one item. For example, referring to <303> of FIG. 3A, the activated second object 320*a* may be displayed to be extended to include a second selection item 322 for setting the second condition (e.g., location condition). As another example, referring to <303> of FIG. 3A, the activated second object 320*a*, together with the second selection item 322, may be displayed to be extended to include a third selection item 323 for selecting a time section. A description of the time section is described below in operations 207 and 209. According to an embodiment, the electronic device 101 may obtain a second input for setting the second condition through the activated second object 320*a*. For example, referring to <303> of FIG. 3A, the electronic device 101 may obtain a user interaction for selecting a specific location (e.g., the user's home) corresponding to the second condition, as the second input, through the second selection item 322 or obtain a user interaction for receiving a specific location, as the second image. The second input for selecting the specific location may include an input for selecting the specific location on a map or an input for selecting one of locations previously stored in the electronic device 101, but is not limited. According to an embodiment, in response to obtaining the second input, the electronic device 101 may set a second condition regarding a specific location. For example, the second condition regarding the specific location may include a condition for determining whether the current location of the electronic device 101 identified corresponds to the specific location (e.g., the user's home) (or whether the current location is included in a designated range including the specific location). The second condition regarding the specific location may include a condition for determining whether the location of the electronic device 101 has changed from another location to the specific location or a condition for determining whether the location of the electronic device 101 has changed from the specific location to another location. According to an embodiment, the electronic device 101 may deactivate the activated second object 320*a* based on a user input. For example, referring to <303> of FIG. 3A, the electronic device 101 may deactivate the activated second object 320*a* upon obtaining a user input (e.g., tap) to the button 321 (e.g., toggle button) indicating the activation state of the activated second object 320*a*. The operation of deactivating the activated second object 320*a* may mean the operation of switching into a state in which the second condition (e.g., location condition) may not be set and may include the operation of displaying a relatively shrunken second object 320 which does not include the second selection item 322 and the third selection item 323 being displayed. As an element used to activate or deactivate the second object 320, the button 321 is merely an example, but without limitations thereto, various elements may be used to activate or deactivate the second object 320.In operations 205, 207, and 209 below, the operation of determining one of a first notification condition, a second notification condition, or a third notification condition as the first condition and/or the second condition is set is described. Meanwhile, the first notification condition may have a format constituted of time, and the second notification condition and the third notification condition may have formats constituted of place and section. In other words, the second notification condition and the third notification condition may have the same format, and being the same format is assumed to be easily understood by one of ordinary skill in the art. In the second notification condition and the third notification condition, the ordinal numbers of 'second' and 'third' may be distinguished according to input information (e.g., the first condition (time condition)), and a detailed description thereof is given below in connection with operation 207 and operation 209.

In operation 205, according to various embodiments, the electronic device 101 (e.g., the processor 120 of FIG. 1) may determine the first notification condition based on the second condition being not set but the first condition being set. For example, referring to <302> of FIG. 3A, while the second object 320 is inactive, and the first object 310 is active, the electronic device 101 may set the first condition (e.g., 7:00 AM October 3) through the first object 310 and then, upon receiving a notification setting request input from the user, determine the first notification condition (e.g., output a notification when the first condition is met) using the first condition. As described above, the active state of the first object 310 may mean a state in which the first condition has been set or, although not set, the first condition may be set, and the inactive state of the first object 310 may mean a state in which the setting of the first condition is impossible. The active state of the second object 320 may mean a state in which the second condition has been set or, although not set, the second condition may be set, and the inactive state of the second object 320 may mean a state in which the setting of the second condition is impossible.

In operation 207, according to various embodiments, the electronic device 101 (e.g., the processor 120 of FIG. 1) may determine the second notification condition based on the first condition being not set and the second condition being set.

According to various embodiments, while the first object 310 is inactive and the second object 320 is active, the electronic device 101 (e.g., the processor 120 of FIG. 1) may set the first condition based on selection of any one of a plurality of candidates for setting the first condition, based on the first condition being not set and the second condition being set, but this is an example, and the scheme of setting the first condition is not limited. For example, when the first condition is a time condition, the electronic device 101 may display a plurality of predetermined first time sections and identify selection of a first specific time section from the plurality of first time sections. According to an embodiment, the electronic device 101 may display an object for selecting one time section from the plurality of predetermined first time sections, through the display module 160. For example, referring to <303> of FIG. 3A, in response to a user input to the third selection item 323 included in the activated second object 320*a*, the electronic device 101 may display a first menu screen 324 including a plurality of first items corresponding to a plurality of predetermined first time sections. As used throughout the disclosure, 'time section' may mean a time range as a condition for providing a notification, and a notification may be provided if the second condition (e.g., location condition) is met within the corresponding time section. If the first condition (e.g., time condition) is not set, and the second condition (e.g., location condition) alone is set, the time section to be applied to the third selection item 323 may be a relatively broad time range and be selected from a plurality of predetermined first time sections and, when the first condition and the second condition both are set, the time section to be applied to the third selection item 323 may be a relatively narrow time section and be selected from a plurality of second time sections having specific time intervals with respect to the second condition. For example, when both the location condition and the time condition are set, the time condition intended by the user is preset, so that a time section when a notification may be provided may be set with respect to a preset time condition. Meanwhile, if the location condition alone is set, the time condition intended by the user is not identified, so that the time section when a notification is possible may be set to be relatively large, but this is merely an example, and the time section is not limited in length. Meanwhile, if the time condition alone is set by the user, only the arrival of the time intended by the user is the only notification condition regardless of whether other additional conditions are met, so that selection of the time section may be deactivated. The plurality of predetermined first time sections may include a first time section (e.g., always), a second time section (e.g., in the morning (4:00 AM to 12:00 PM)), a third time section (e.g., in the afternoon (12:00 PM to 6:00 PM)), a fourth time section (e.g., in the evening (5:00 PM to 12:00 AM)), and a fifth time section (e.g., at night (11:00 PM to 5:00 AM)), but the above-described example is merely an example, and may be set in various ways by the user or the manufacturer of the electronic device 101. A detailed description of the plurality of second time sections determined based on the second condition is given below in operation 209. According to an embodiment, the electronic device 101 may identify selection of a first specific time section based on an input for selecting an object for selecting one time section from the plurality of predetermined first time sections. For example, referring to <303> of FIG. 3A, the electronic device 101 may identify a first specific time section (e.g., in the morning (4:00 AM to 12:00 PM)) corresponding to the first specific item based on a user input to the first specific item from a plurality of first items included in the first menu screen 324.

According to various embodiments, the electronic device 101 (e.g., the processor 120 of FIG. 1) may identify the first specific time section selected most from the plurality of predetermined first time sections in a state in which the first object 310 is inactive and the second object 320 is active and apply the first specific time section as a default time section of the third selection item 323 of the second object 320, but is not limited thereto. For example, the default time section may be set as a default value. For example, referring to <303> of FIG. 3A, the first specific time section (e.g., always) used most among the plurality of predetermined first time sections may be identified and, in this case, the first specific time section may be applied as the default time section of the third selection item 323 of the second object 320 without an additional user input through the first menu screen 324. According to an embodiment, the electronic device 101 may apply a specific effect (e.g., at least one of resize, font change, color change, shade, or highlight) to the text indicating the default time section to allow the user to easily distinguish the default time section from other time sections or display an indicator (e.g., a check-shaped indicator) in the position adjacent to the item indicating the default time section. According to an embodiment, based on a user input for selecting a time section other than the default time section through the first menu screen 324 in a state in which the default time section is applied to the third selection item 323, the electronic device 101 may release the application of the default time section and apply the selected other time section to the third selection item 323.

According to various embodiments, the electronic device 101 (e.g., the processor 120 of FIG. 1) may determine the second notification condition using the second condition applied to the second selection item 322 in the activated second object 320a and the first specific time section applied to the third selection item 323. For example, referring to <303> of FIG. 3A, while the first object 310 is inactive and the activated second object 320a is identified, the electronic device 101 may select the first specific time section (e.g., always) and the second condition (e.g., when arriving home) through the activated second object 320a and, upon receiving a notification setting request input from the user, determine the second notification condition (e.g., output a notification when arriving home at any time) using the second condition and the first specific time section, but the notification indicating the condition is not limited. Meanwhile, if the "second time section (e.g., in the morning (4:00 AM to 12:00 PM)" is selected, the second notification condition may be set as outputting a notification when arriving home in the morning (4:00 AM to 12:00 PM).

In operation 209, according to various embodiments, the electronic device 101 (e.g., the processor 120 of FIG. 1) may determine the third notification condition based on the first condition and the second condition being set.

According to an embodiment, the electronic device 101 may determine a plurality of second time sections using the first condition, based on the first condition and second condition being set, using the activated first object 310a and the activated second object 320a. According to an embodiment, the electronic device 101 may determine the plurality of second time sections with respect to a specific time specified by the first condition. For example, the electronic device 101 may determine a reference time (e.g., 4:00 PM on October 3 (on time)) specified by the first condition selected through the activated first object 310a, a first specific time section (e.g., 4:00 PM to 5:00 PM) having a first section interval (e.g., for 1 hour) from the reference time, a second specific time section (e.g., 4:00 PM to 6:00 PM) having a second section interval (e.g., for 2 hours) from the reference time, and a third specific time section (e.g., 4:00 PM to 7:00 PM) having a third section interval (e.g., for 3 hours) from the reference time. According to an embodiment, the predetermined section intervals (e.g., 1 hour, 2 hours, and 3 hours) may be set by the user or the manufacturer of the electronic device 101, but are not limited thereto.

According to an embodiment, the electronic device 101 may determine the plurality of second time sections further using context information, based on the first condition and second condition being set, using the activated first object 310a and the activated second object 320a. For example, the electronic device 101 may determine the plurality of second time sections using the context information (e.g., weather clear now) related to the first condition (e.g., 7:00 AM) and the second condition (e.g., when arriving at work). The operation of determining the plurality of second time sections using the context information is described below in detail in connection with FIG. 4.

According to an embodiment, the electronic device 101 may display a second menu screen including a plurality of second items corresponding to the plurality of second time sections, through the display module 160. For example, referring to <304> of FIG. 3A, in response to a user input to the third selection item 323, the electronic device 101 may display a second menu screen 325 including the plurality of second items corresponding to the plurality of second time sections. According to an embodiment, the electronic device 101 may identify a second specific time section corresponding to the second specific item selected by the user from the plurality of second items. For example, referring to <304> of FIG. 3A, the electronic device 101 may receive a user selection for the second specific item from the plurality of second items included in the second menu screen 325 and identify a second specific time section (e.g., 4:00 PM to 5:00 PM) corresponding to the second specific item. According to an embodiment, the electronic device 101 may apply the second specific time section identified based on the user selection to the third selection item 323.

According to an embodiment, the electronic device 101 may select the second specific time section as the default time section from the plurality of second time sections according to a predetermined setting state for the third selection item 323 and automatically apply the selected second specific time section. For example, referring to <305> of FIG. 3B, the electronic device 101 may select the second specific time section (e.g., 7:00 AM to 1:00 PM) from the plurality of second time sections according to a predetermined setting state for the third selection item 323 and automatically apply the selected second specific time section to the third selection item 323 without the need for obtaining an input for the time section from the user. According to an embodiment, the predetermined setting state may include a state of having been set to select the default time section, a state of having been set to select a recommendation time section, or a state of having been set to select a predetermined time section (e.g., on time or for 1 hour). The operation of determining the recommendation time section is described below with reference to FIGS. 7 and 8.

According to an embodiment, the electronic device 101 may identify the second specific time section used most among the plurality of second time sections in a state in which the first object 310 and the second object 320 are active and apply the second specific time section as a default time section of the third selection item 323 of the second object 320. For example, referring to <302> and <304> of FIG. 3A, the electronic device 101 may identify the first specific time section (e.g., on time) used most among the plurality of second time sections in a state in which the first object 310 and the second object 320 are active and, in this case, apply the second specific time section, as the default time section of the third selection item 323 of the activated second object 320a, without the user's additional input through the second menu screen 325.

According to an embodiment, the electronic device 101 may determine the third notification condition using the second condition applied to the second selection item 322 in the activated second object 320a and the second specific time section applied to the third selection item 323. For example, referring to <304> of FIG. 3A, the electronic device 101 may select the second specific time section (e.g., for 1 hour (4:00 PM to 5:00 PM)) and the second condition (e.g., when arriving home) through the activated second object 320a, of the activated first object 310a and the activated second object 320a, and, upon receiving a notification setting request input from the user, determine the third notification condition (e.g., output a notification when arriving at home between 4:00 PM and 5:00 PM) using the second condition and the second specific time section.

In operation 211, according to various embodiments, the electronic device 101 (e.g., the processor 120 of FIG. 1) may control the display module 160 to display a notification information object corresponding to a specific notification condition based on the specific notification condition being determined. For example, referring to <306> of FIG. 3B, the electronic device 101 may display, through the display module 160, notification information objects 361, 362, and 363 corresponding to the specific notification condition based on the specific notification condition (e.g., one of the above-described first notification condition to third notification condition) being determined. For example, the notification information object 361 may correspond to the notification condition set based on the first condition of "anytime" and the second condition of "arriving: Home," and the notification information object 362 may correspond to the notification condition set based on the first condition of "Apr. 1, 2019, 16:00," and the notification information object 363 may correspond to the notification condition set based on the first condition of "Today 4 PM-5 PM" and the second condition of "arriving: Home," but this is an example, and the indicators displayed in each notification information object are described below with reference to FIG. 11.

In operation 213, according to various embodiments, the electronic device 101 (e.g., the processor 120 of FIG. 1) may output a specific notification corresponding to the specific notification condition, based on the specific notification condition being met.

According to an embodiment, when the first notification condition is determined, the electronic device 101 may determine that the first notification condition is met based on the identified current time corresponding to the specific time specified by the first condition. According to an embodiment, when the second notification condition is determined, the electronic device 101 may determine that the second notification condition is met if it is present in a specific location specified by the second condition within the first specific time section, it moves to the specific location, or it leaves the specific location. According to an embodiment, when the third notification condition is determined, the electronic device 101 may determine that the third notification condition is met if it is present in a specific location specified by the second condition within the second specific time section, it moves to the specific location, or it leaves the specific location.

According to an embodiment, the electronic device 101 may output a specific notification corresponding to the specific notification condition, based on the specific notification condition being met. For example, referring to <307> of FIG. 3B, the electronic device 101 may provide a notification to enable output of sound or vibration while displaying, on the display module 160, information (e.g., location and/or specific time section) indicating the specific notification condition (e.g., the first condition and/or the second condition) and a memo (e.g., laundry) pre-stored by the user, based on the third notification condition (e.g., output a notification when leaving home between 7:00 AM to 1:00 PM) being met.

Figure 4:
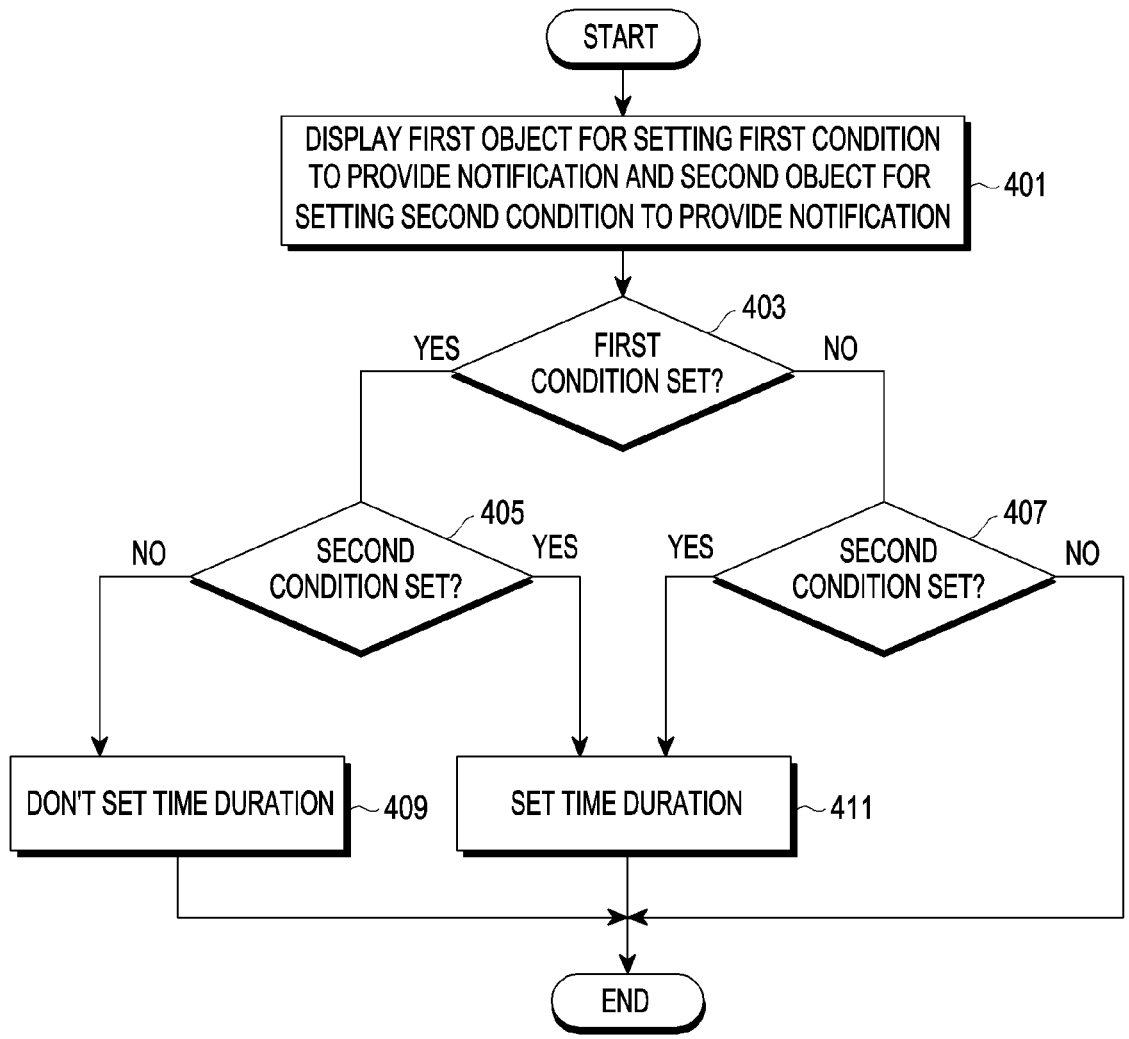
FIG. 4 is a flowchart illustrating an operation method of an electronic device according to an embodiment of the disclosure.

FIG. 4 is a flowchart illustrating an operation method of an electronic device (e.g., the electronic device 101 of FIG. 1) according to an embodiment of the disclosure.

Referring to FIG. 4, in operation 401, according to various embodiments, the electronic device 101 (e.g., the processor 120 of FIG. 1) may control the display (e.g., the display module 160 of FIG. 1) to display a first object (e.g., the first object 310 of FIG. 3A) for setting a first condition (e.g., time condition) to provide a notification and a second object (e.g., the second object 320 of FIG. 3A) for setting a second condition (e.g., location condition) to provide a notification. According to various embodiments, the electronic device 101 may display the first object and the second object on the display module 160 using the method described in connection with operation 201 of FIG. 2.

In operation 403, according to various embodiments, the electronic device 101 (e.g., the processor 120 of FIG. 1) may determine whether the first condition is set. According to an embodiment, the electronic device 101 may identify the setting of the first condition based on a first input obtained through the activated first object 310a according to operation 203 of FIG. 2.

In operation 405, according to various embodiments, the electronic device 101 (e.g., the processor 120 of FIG. 1) may determine whether the second condition is set in a state in which the first condition has been set. According to an embodiment, the electronic device 101 may identify the setting of the second condition based on a second input obtained through the activated second object 320a according to operation 203 of FIG. 2.

In operation 407, according to various embodiments, the electronic device 101 (e.g., the processor 120 of FIG. 1) may determine whether the second condition is set in a state in which the first condition has not been set. According to an embodiment, the electronic device 101 may identify the setting of the second condition based on a second input obtained through the activated second object 320a according to operation 203 of FIG. 2. Meanwhile, FIG. 4 illustrates an example in which after determining whether the first condition is set in operation 403, it is determined whether the second condition is set in operation 405 or 407, but this is an example. According to various embodiments, it will be appreciated by one of ordinary skill in the art that whether the first condition is set may be determined after determining whether the second condition is set, or determination of whether the first condition is set and determination of whether the second condition is set may be performed at least simultaneously.

In operation 409, according to various embodiments, when the first condition is set and the second condition is not set, the electronic device 101 (e.g., the processor 120 of FIG. 1) may not set a time section which is a time range, as a condition for providing a notification. In this case, the electronic device 101 may determine the notification condition using a specific time, not the specific time section, according to operation 205 of FIG. 2.

In operation 411, according to various embodiments, (1) when both the first condition and the second condition are set according to the determination in operation 405 or (2) when the first condition is not set and the second condition is set according to the determination in operation 407, the electronic device 101 (e.g., the processor 120 of FIG. 1) may determine a plurality of time sections and set one time section from the plurality of time sections. According to an embodiment, when the first condition is not set and the second condition is set, the electronic device 101 may determine a plurality of time sections having predetermined section intervals and set one time section from the plurality of time sections according to the setting of the electronic device 101 or a user input. In this case, the electronic device 101 may perform the operation when the first condition is not set and the second condition is set, based on operation 207 of FIG. 2. According to an embodiment, when both the first condition and the second condition are set, the electronic device 101 may determine the plurality of time sections using the first condition and set one time section from the plurality of time sections according to the setting of the electronic device 101 or a user input. In this case, the electronic device 101 may perform the operation when the first condition and second condition both are set, based on operation 209 of FIG. 2. For example, the time section set when both the first condition and the second condition are set (e.g., Yes in 405) and the time section set when the first condition is not set but the second condition alone is set (Yes in 407) may differ from each other.

Figure 5A:
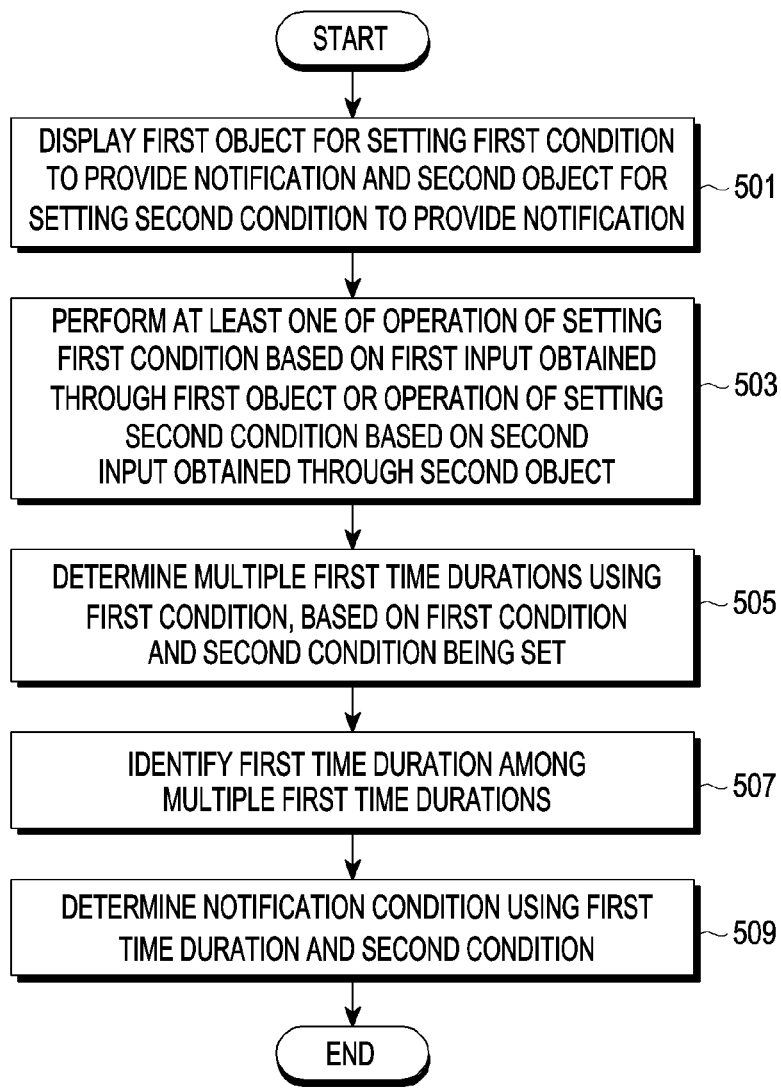
FIG. 5A is a flowchart illustrating an operation method of an electronic device according to an embodiment of the disclosure.

FIG. 5A is a flowchart illustrating an operation method of an electronic device (e.g., the electronic device 101 of FIG. 1) according to an embodiment of the disclosure.

Figure 5B:
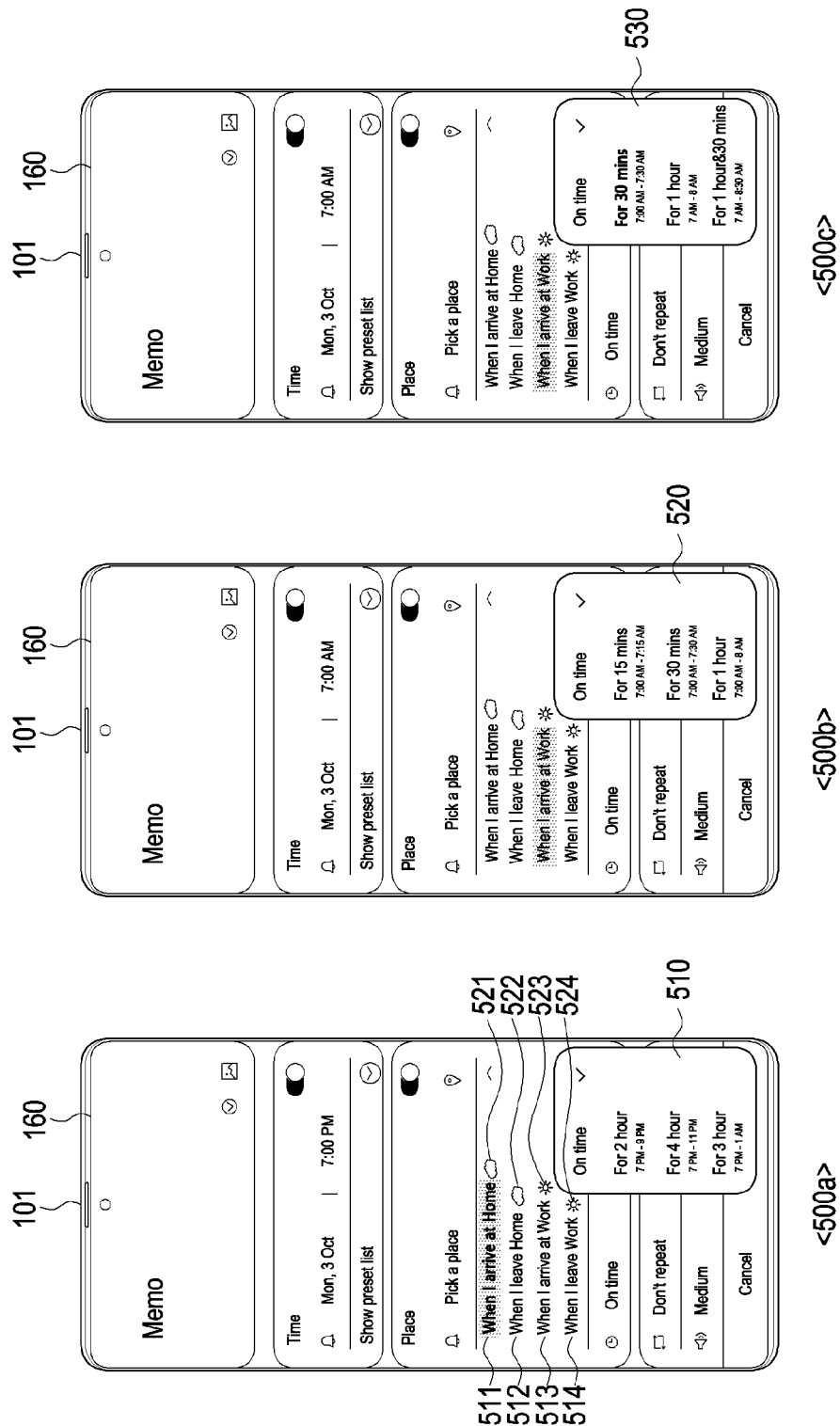
FIG. 5B is a view illustrating an operation in which an electronic device determines a notification condition using a time section and a second condition according to an embodiment of the disclosure.

FIG. 5B is a view illustrating an operation in which an electronic device 101 determines a notification condition using a time section and a second section according to an embodiment of the disclosure.

Referring to FIGS. 5A and 5B, in operation 501, according to various embodiments, the electronic device 101 (e.g., the processor 120 of FIG. 1) may control the display (e.g., the display module 160 of FIG. 1) to display a first object (e.g., the first object 310 of FIG. 3A) for setting a first condition (e.g., time condition) to provide a notification and a second object (e.g., the second object 320 of FIG. 3A) for setting a second condition (e.g., location condition) to provide a notification. According to various embodiments, the electronic device 101 may display the first object and the second object on the display module 160 using the method described in connection with operation 201 of FIG. 2.

In operation 503, according to various embodiments, the electronic device 101 (e.g., the processor 120 of FIG. 1) may perform at least one of the operation of setting the first condition based on the first input obtained through the activated first object (e.g., the activated first object 310a of FIG. 3A) or the operation of setting the second condition based on the second input obtained through the activated second object (e.g., the activated second object 320a of FIG. 3A). According to various embodiments, the electronic device 101 may perform the operation of setting at least one of the first condition or second condition using the method described in connection with operation 203 of FIG. 2.

In operation 505, according to various embodiments, the electronic device 101 (e.g., the processor 120 of FIG. 1) may determine a plurality of first time sections using the first condition, based on the first condition and the second condition being set.

According to various embodiments, the electronic device 101 (e.g., the processor 120 of FIG. 1) may determine a plurality of first time sections using the first condition, based on the first condition and second condition being set, using the activated first object 310a and the activated second object 320a. According to an embodiment, the electronic device 101 may determine the plurality of first time sections using the specific time specified by the first condition and the predetermined section interval. For example, the electronic device 101 may determine the plurality of first time sections by applying each of the plurality of section intervals with respect to the specific time specified by the first condition. The above-described example has been described through <304> of FIG. 3A in operation 209 of FIG. 2, and a detailed description thereof is thus omitted. According to an embodiment, the electronic device 101 may determine the plurality of first time sections using the plurality of section intervals identified based on the first condition and the context information. The context information may be information related to the second condition and may include at least one of the user's preferred location information related to the second condition, the distance between the specific location indicated by the second condition and the current location of the electronic device 101, information about the user's preferred transportation related to the second condition, traffic information between the specific location and the current location of the electronic device 101, or weather forecast information in the specific location under the first condition.

According to an embodiment, the electronic device 101 may determine the plurality of first time sections further based on whether the specific location indicated by the second condition corresponds to the user's preferred location. In this regard, when the total number of times in which the specific location indicated by the second condition is set is a predetermined number or more, the electronic device 101 may determine that the specific location is the user's preferred location. For example, when the specific location indicated by the second condition corresponds to the user's preferred location, 'user's home,' in a state in which the user's preferred location is set to 'user's home,' the section intervals, e.g., one hour, two hours, or three hours, may be set and, unless the specific location indicated by the second condition is the user's preferred location, the section intervals, e.g., two hours, four hours, or six hours, may be set.

According to an embodiment, the electronic device 101 may determine the plurality of first time sections further based on whether the distance between the specific location indicated by the second condition and the current location of the electronic device 101 is a predetermined distance or more. For example, when the distance between the current location of the electronic device 101 and the specific location indicated by the second condition is less than the predetermined distance, the section intervals, one hour, two hours, or three hours, may be set and, when the distance between the current location of the electronic device 101 and the specific location indicated by the second condition is the predetermined distance or more, section intervals, two hours, four hours, or six hours, may be set.

According to an embodiment, the electronic device 101 may identify the user's preferred transportation for the specific location indicated by the second condition and determine the plurality of first time sections further based on the preferred transportation. In this regard, when the number of times in which the user rides the transportation, for the specific location indicated by the second condition, is a predetermined number or more, the electronic device 101 may register the transportation as the user's preferred transportation for the specific location and store it in the memory (e.g., the memory 130 of FIG. 1). For example, when the user's preferred transportation information is of a first type (e.g., vehicle), section intervals, one hour, two hours, or three hours, may be set and, when the user's preferred transportation information is of a second type (e.g., walking), section intervals, two hours, four hours, or six hours, may be set.

According to an embodiment, the electronic device 101 may identify traffic information between the specific location indicated by the second condition in the first condition and the current location of the electronic device 101 and determine the plurality of first time sections further based on the traffic information. For example, when the traffic information is of the first type (e.g., light), section intervals, one hour, two hours, or three hours, may be set and, when the traffic information is of the second type (e.g., heavy), section intervals, two hours, four hours, or six hours, may be set.

According to an embodiment, the electronic device 101 may identify weather forecast information in the specific location under the first condition and determine the plurality of first time sections further based on the weather forecast information. For example, when the weather forecast information is a first type (e.g., clear), section intervals, one hour, two hours, or three hours, may be set and, when the weather forecast information is a second type (e.g., cloudy), section intervals, two hours, four hours, or six hours, may be set.

According to an embodiment, the electronic device 101 may determine the plurality of first time sections based on at least two or more contexts among the above-described context information.

For example, referring to <500a>, when it is identified (1) that the specific location (e.g., home) indicated by the second condition corresponds to the user's preferred location, (2) that the distance between the specific location and the current location of the electronic device 101 is the predetermined distance or more, (3) that the user's preferred transportation for the specific location is a 'vehicle,' (4) that the traffic information between the specific location in the first condition and the current location of the electronic device 101 is 'heavy,' and (5) that the weather forecast information in the specific location in the first condition is 'cloudy,' in a state in which the first condition (e.g., 7:00 PM October 3) and the second condition (e.g., when arriving home) has been set, the electronic device 101 may determine the reference time (e.g., 7:00 PM (on time) October 3) specified by the first condition, the first specific time section (e.g., 7:00 PM to 9:00 PM) having the first section interval (e.g., two hours) from the reference time, the second specific time section (e.g., 7:00 PM to 11:00 PM) having the second section interval (e.g., four hours) from the reference time, and the third specific time section (e.g., 7:00 PM to 1:00 AM) having the third section interval (e.g., six hours) from the reference time, as the plurality of first time sections.

As another example, referring to <500b>, when it is identified (1) that the specific location (e.g., work) indicated by the second condition corresponds to the user's preferred location, (2) that the distance between the specific location and the current location of the electronic device 101 is less than the predetermined distance, (3) that the user's preferred transportation for the specific location is a 'vehicle,' (4) that the traffic information between the specific location in the first condition and the current location of the electronic device 101 is 'light,' and (5) that the weather forecast information in the specific location in the first condition is 'clear,' in a state in which the first condition (e.g., 7:00 PM October 3) and the second condition (e.g., when arriving at work) has been set, the electronic device 101 may determine the reference time (e.g., 7:00 AM (on time) October 3) specified by the first condition, the first specific time section (e.g., 7:00 AM to 7:15 AM) having the first section interval (e.g., 15 minutes) from the reference time, the second specific time section (e.g., 7:00 AM to 7:30 AM) having the second section interval (e.g., 30 minutes) from the reference time, and the third specific time section (e.g., 7:00 AM to 8:00 AM) having the third section interval (e.g., one hour) from the reference time, as the plurality of first time sections.

As another example, referring to <500c>, when only traffic information is identified as 'heavy' in the above-described <500b> context, the electronic device 101 may determine the reference time (e.g., 7:00 AM (on time) October 3) specified by the first condition, the first specific time section (e.g., 7:00 AM to 7:30 AM) having the first section interval (e.g., 30 minutes) from the reference time, the second specific time section (e.g., 7:00 AM to 8:00 AM) having the second section interval (e.g., one hour) from the reference time, and the third specific time section (e.g., 7:00 AM to 8:30 AM) having the third section interval (e.g., one and a half hours) from the reference time, as the plurality of first time sections. According to an embodiment, the electronic device 101 may display a context information indicator indicating the context information in association with the second condition. For example, referring to <500a>, the electronic device 101 may display context information indicators 521, 522, 523, and 524 (e.g., sun or cloud) indicating weather information in the second condition, next to the items 511, 512, 513, and 514 indicating each second condition.

In operation 507, according to various embodiments, the electronic device 101 (e.g., the processor 120 of FIG. 1) may identify a first time section from the plurality of first time sections.

According to an embodiment, the electronic device 101 may control the display module 160 to display a third object for selecting one time section from the plurality of first time sections. For example, referring to <500a> and <500c>, the electronic device 101 may display, through the display module 160, the third object 510, 520, or 530 (e.g., the second menu screen 325 of FIG. 3A) for selecting one time section from the plurality of first time sections.

According to an embodiment, the electronic device 101 may identify selection of the first time section based on a third input obtained through the third object 510, 520, or 530. For example, referring to <500a>, the electronic device 101 may identify a user selection for the first time section (e.g., 7:00 PM to 11:00 PM) from the plurality of first time sections displayed on the third object 510.

In operation 509, according to various embodiments, the electronic device 101 (e.g., the processor 120 of FIG. 1) may determine a notification condition for providing a notification using the first time section and the second condition. For example, referring to <500a>, the electronic device 101 may determine a notification condition (e.g., output a notification when arriving home between 7:00 PM to 11:00 PM) for providing a notification using the first time section (e.g., 7:00 PM to 11:00 PM) and the second condition (e.g., when arriving home).

Figure 6:
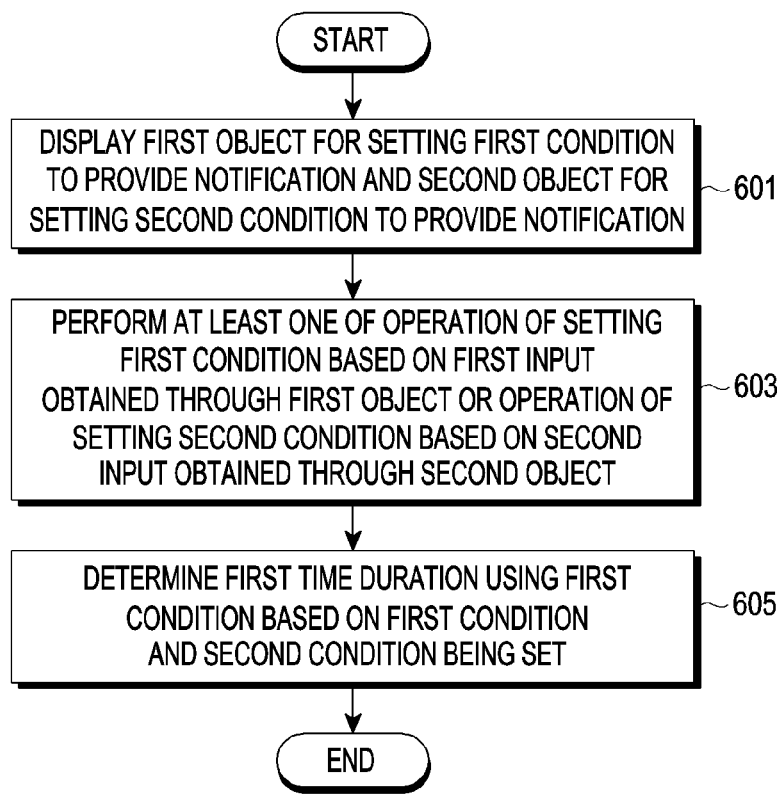
FIG. 6 is a flowchart illustrating an operation method of an electronic device according to an embodiment of the disclosure.

FIG. 6 is a flowchart illustrating an operation method of an electronic device (e.g., the electronic device 101 of FIG. 1) according to an embodiment of the disclosure.

Referring to FIG. 6, in operation 601, according to various embodiments, the electronic device 101 (e.g., the processor 120 of FIG. 1) may control the display (e.g., the display module 160 of FIG. 1) to display a first object (e.g., the first object 310 of FIG. 3A) for setting a first condition to provide a notification and a second object (e.g., the second object 320 of FIG. 3A) for setting a second condition to provide a notification. According to various embodiments, the electronic device 101 may display the first object and the second object on the display module 160 using the method described in connection with operation 201 of FIG. 2.

In operation 603, according to various embodiments, the electronic device 101 (e.g., the processor 120 of FIG. 1) may perform at least one of the operation of setting the first condition based on the first input obtained through the activated first object (e.g., the activated first object 310a of FIG. 3A) or the operation of setting the second condition based on the second input obtained through the activated second object (e.g., the activated second object 320a of FIG. 3A). According to various embodiments, the electronic device 101 may perform the operation of setting at least one of the first condition or second condition using the method described in connection with operation 203 of FIG. 2.

In operation 605, according to various embodiments, the electronic device 101 (e.g., the processor 120 of FIG. 1) may determine a plurality of first time sections, when a notification may be provided, using the first condition, based on the first condition and the second condition being set. According to an embodiment, the electronic device 101 may determine a plurality of first time sections using the first condition, based on the first condition and the second condition being set. As a method for determining the plurality of first time sections using the first condition according to various embodiments, the methods described above in connection with operation 209 of FIG. 2 and operation 505 of FIG. 5B may be used. According to an embodiment, the electronic device 101 may control the display module 160 to display a third object (e.g., the third object 510 of FIG. 5A) for selecting one time section from the plurality of first time sections. According to an embodiment, the electronic device 101 may identify selection of a specific time section based on a third input obtained through the third object 510, thereby determining the selected specific time section as the first time section when a notification may be provided.

Figure 7:
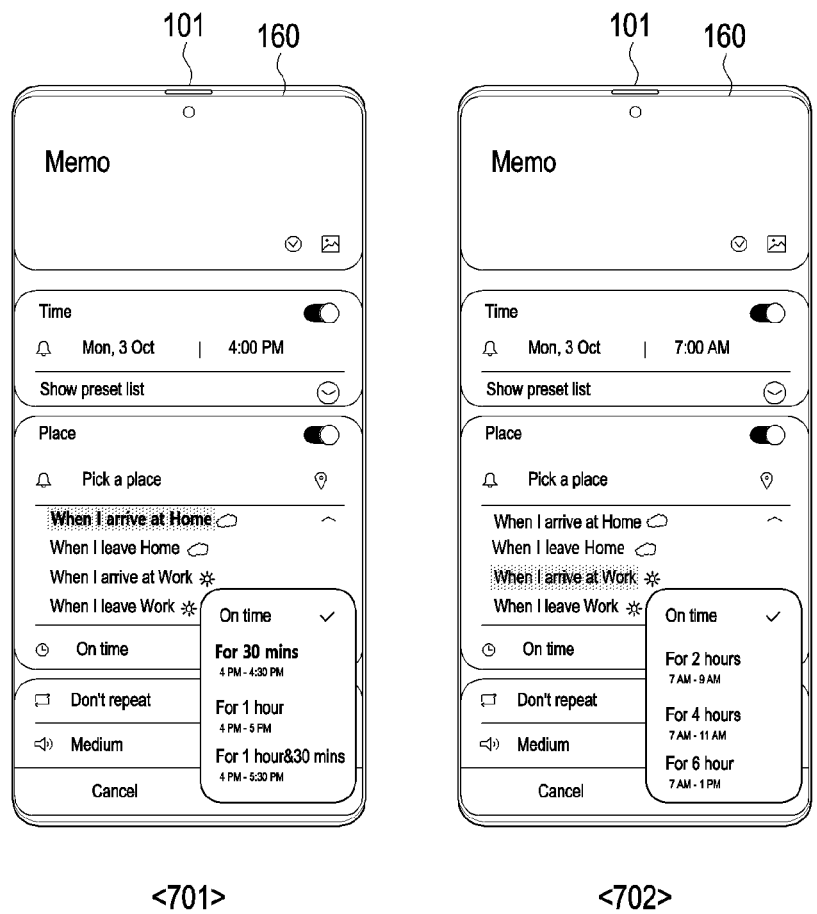
FIG. 7 is a view illustrating an operation in which an electronic device determines a plurality of first time sections based on setting a first condition and a second condition according to an embodiment of the disclosure.

FIG. 7 is a view illustrating an operation in which an electronic device (e.g., the electronic device 101 of FIG. 1) determines a plurality of first time sections based on setting a first condition and a second condition according to an embodiment of the disclosure.

Referring to FIG. 7, the electronic device 101 (e.g., the processor 120 of FIG. 1) may control the display (e.g., the display module 160 of FIG. 1) to display a first object (e.g., the first object 310 of FIG. 3A) for setting a first condition to provide a notification and a second object (e.g., the second object 320 of FIG. 3A) for setting a second condition to provide a notification.

According to various embodiments, the electronic device 101 (e.g., the processor 120 of FIG. 1) may set the first condition based on the first input obtained through the activated first object (e.g., the activated first object 310a of FIG. 3A) and set the second condition based on the second input obtained through the activated second object (e.g., the activated second object 320a of FIG. 3A). For example, referring to <701>, the electronic device 101 may set the first condition (e.g., 4:00 PM October 3) based on the first input obtained through the activated first object 310a and set the second condition (e.g., when arriving home) based on the second input obtained through the activated second object 320a.

According to various embodiments, the electronic device 101 (e.g., the processor 120 of FIG. 1) may determine a plurality of first time sections using the first condition, based on the first condition and the second condition being set. According to an embodiment, the electronic device 101 may determine the plurality of first time sections further using the user's behavior pattern related to at least one of the first condition or the second condition. For example, referring to <701>, the electronic device 101 may determine the reference time (e.g., 4:00 PM (on time) October 3) specified by the first condition, the first specific time section (e.g., 4:00 PM to 4:30 PM) having the first section interval (e.g., 30 minutes) from the reference time, the second specific time section (e.g., 4:00 PM to 5:00 PM) having the second section interval (e.g., one hour) from the reference time, and the third specific time section (e.g., 4:00 PM to 5:30 PM) having the third section interval (e.g., one and a half hours) from the reference time, as the plurality of first time sections, further using the user's behavior pattern (e.g., frequently arriving home between 4:00 PM and 4:30 PM) related to the first condition (e.g., 4:00 PM October 3) and the second condition (e.g., when arriving home). As another example, referring to <702>, the electronic device 101 may determine the reference time (e.g., 7:00 AM (on time) October 3) specified by the first condition, the first specific time section (e.g., 7:00 AM to 9:00 AM) having the first section interval (e.g., two hours) from the reference time, the second specific time section (e.g., 7:00 AM to 11:00 AM) having the second section interval (e.g., four hours) from the reference time, and the third specific time section (e.g., 7:00 AM to 1:00 PM) having the third section interval (e.g., six hours) from the reference time, as the plurality of first time sections, further using the user's behavior pattern (e.g., frequently arriving at work after 9:00 AM) related to the first condition (e.g., 7:00 AM October 3) and the second condition (e.g., when arriving at work). According to an embodiment, the electronic device 101 may determine the specific section interval based on the result of analysis of the user's behavior pattern and determine the plurality of first time sections by applying the specific section interval to the specific time indicated by the first condition. For example, the electronic device 101 may determine that the average time (e.g., 30 minutes) required until the specific location indicated by the second condition is met from the location of the electronic device 101 at the time when the second condition is set is the specific section interval and may determine that the first specific time section having the specific section interval (e.g., 30 minutes) from the specific time, the second specific time section having the section interval (e.g., one hour) which is a first predetermined number times (e.g., two times) the specific section interval from the specific time, and the third specific time section having the section interval (e.g., one and a half hours) which is a second predetermined number times (e.g., three times) the specific section interval from the specific time, as the plurality of first time sections. In this case, if the time difference between the maximum required time (e.g., three hours) and the minimum required time (e.g., one hour) among the times required until the specific location indicated by the second condition is met from the location of the electronic device 101 at the time when the second condition is set exceeds a predetermined period (e.g., one and a half hours), the electronic device 101 may set the section intervals of the plurality of first time sections as predetermined section intervals (e.g., two hours, four hours, or six hours). According to an embodiment, the electronic device 101 may determine that the section interval (e.g., one hour) selected a predetermined number of times or more by the user is the above-described specific section interval. According to an embodiment, the electronic device 101 may determine that the section interval (e.g., two hours) from the time when the second condition is set to the time when the second condition is met is the above-described specific section interval. According to an embodiment, the electronic device 101 may determine that the section intervals (e.g., two hours by walking, one hour by car, or 30 minutes by subway) corresponding to the user's transportations (e.g., walking, vehicle, and subway) identified at the time when the first condition and/or the second condition are the above-described specific section intervals.

According to an embodiment, the electronic device 101 may determine a recommendation time section from the plurality of first time sections based on the user's behavior pattern. For example, referring to <701>, the electronic device 101 may identify the first specific time section (e.g., 4:00 PM to 4:30 PM) selected most or a predetermined number of times or more from the plurality of first time sections when the first condition (e.g., 4:00 PM October 3) and the second condition (e.g., when arriving home) are set and determine that the first specific time section is the recommendation time section. According to an embodiment, the electronic device 101 may determine the recommendation time section from the plurality of first time sections based on at least one of the distance between the specific location indicated by the second condition and the current location of the electronic device 101, the weather forecast information in the specific location in the first condition, whether a location registered as a popular place on a specific application corresponds to the specific location, traffic information between the specific location and the current location of the electronic device 101, the difference between the specific time indicated by the first condition and the first condition, or information (e.g., popular place or registered schedule) obtained from a predetermined application (e.g., map application or scheduler application).

Figure 8:
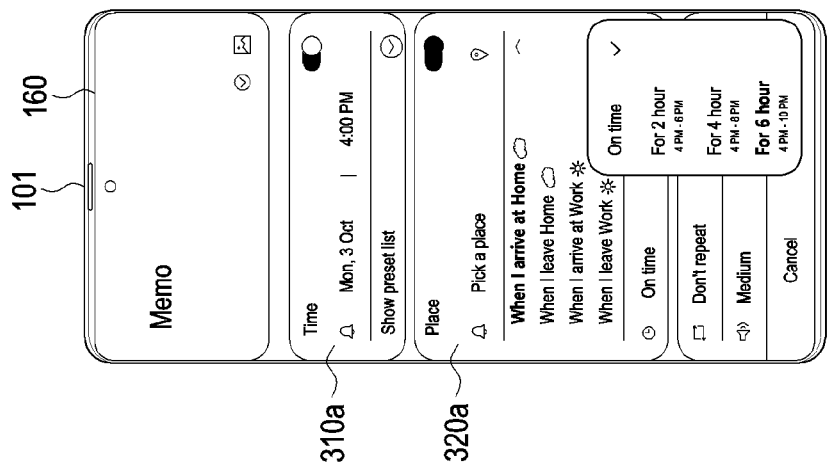
FIG. 8 is a view illustrating an operation in which an electronic device determines a plurality of first time sections based on setting a first condition and a second condition according to an embodiment of the disclosure.
Figure 8:
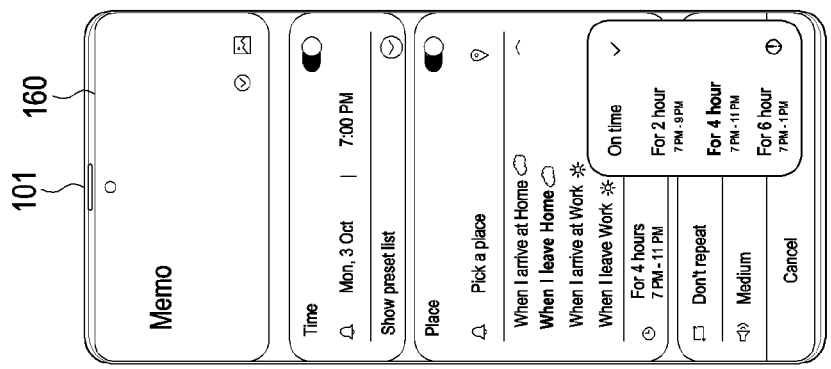
Figure 8:
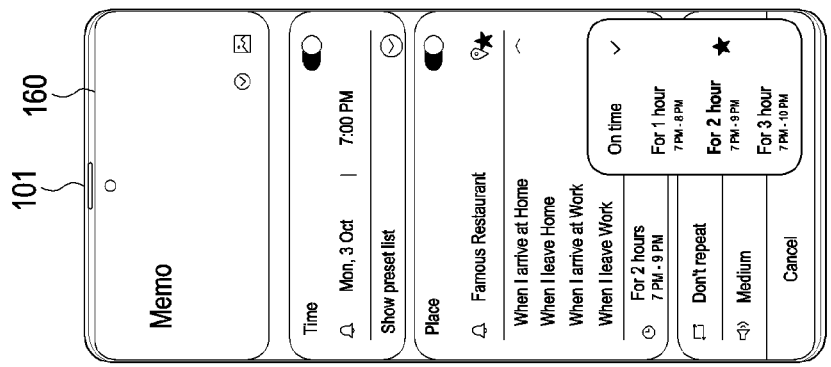

FIG. 8 is a view illustrating an operation in which an electronic device (e.g., the electronic device 101 of FIG. 1) determines a plurality of first time sections based on setting a first condition and a second condition according to an embodiment of the disclosure.

Referring to FIG. 8, the electronic device 101 (e.g., the processor 120 of FIG. 1) may control the display (e.g., the display module 160 of FIG. 1) to display a first object (e.g., the first object 310 of FIG. 3A) for setting a first condition to provide a notification and a second object (e.g., the second object 320 of FIG. 3A) for setting a second condition to provide a notification.

According to various embodiments, the electronic device 101 (e.g., the processor 120 of FIG. 1) may set a first condition based on a first input obtained through the first object 310 and set a second condition based on a second input obtained through the second object 320. For example, referring to <801>, the electronic device 101 may set the first condition (e.g., 4:00 PM October 3) based on the first input obtained through the first object 310 and set the second condition (e.g., when arriving home) based on the second input obtained through the second object 320.

According to various embodiments, the electronic device 101 (e.g., the processor 120 of FIG. 1) may determine a plurality of first time sections using the first condition, based on the first condition and the second condition being set.

According to an embodiment, when the specific time indicated by the first condition is within a predetermined period from the time when the first condition is set, and the distance between the specific location indicated by the second condition and the current location of the electronic device 101 is a predetermined distance or more, the electronic device 101 may change the section interval of the plurality of first time sections from the first section interval to a second section interval longer than the first section interval. For example, referring to <801>, when the specific time indicated by the first condition is within a predetermined period (e.g., 24 hours) from the time when the first condition is set, and the distance between the specific location indicated by the second condition and the current location of the electronic device 101 is the predetermined distance or more, the electronic device 101 may change the section intervals of the plurality of first time sections from the first section intervals (e.g., specific time, one hour, two hours, and three hours) into predesignated second section intervals (e.g., specific time, two hours, four hours, and six hours) for the predetermined distance or more. As another example, when the specific time indicated by the first condition is within a predetermined period (e.g., 24 hours) from the time when the first condition is set, and the distance between the specific location indicated by the second condition and the current location of the electronic device 101 is less than the predetermined distance, the electronic device 101 may change the section intervals of the plurality of first time sections from the first section intervals (e.g., specific time, one hour, two hours, and three hours) into predesignated third section intervals (e.g., specific time, 30 minutes, one hour, and one and a half hours) for less than the predetermined distance. In the above-described examples, when the distance between the specific location indicated by the second condition and the current location of the electronic device 101 is far, the electronic device 101 may provide relatively longer section intervals than the default section interval and, when close, provide relatively shorter section intervals than the default section interval.

According to an embodiment, when the weather forecast information in the first condition and second condition corresponds to specific weather information, the electronic device 101 may change the section interval of the plurality of first time sections from the first section interval to the second section interval longer than the first section interval. For example, referring to <802>, when the weather forecast information in the first condition (e.g., 7:00 PM October 3) and the second condition (e.g., when leaving home) corresponds to first weather information (e.g., cloudy), the electronic device 101 may change the section intervals of the plurality of first time sections from the first section intervals (e.g., specific time, one hour, two hours, and three hours), which are default section intervals, to predesignated second section intervals (e.g., specific time, one hour, two hours, and three hours) for the first weather information. As another example, when the weather forecast information in the first condition (e.g., 7:00 PM October 3) and the second condition (e.g., when leaving home) corresponds to second weather information (e.g., clear), the electronic device 101 may change the section intervals of the plurality of first time sections from the first section intervals (e.g., specific time, one hour, two hours, and three hours), which are default section intervals, to predesignated third section intervals (e.g., specific time, 30 minutes, one hour, and one and a half hours) for the second weather information. In the above-described examples, when the weather is cloudy, the electronic device 101 may provide relatively longer section intervals than the default section interval and, when the weather is clear, provide relatively shorter section intervals than the default section interval.

According to an embodiment, when the specific location indicated by the second condition corresponds to a predetermined location, the electronic device 101 may change the section interval of the plurality of first time sections from the first section interval to the second section interval longer than the first section interval. For example, referring to <803>, when the specific location indicated by the second condition corresponds to the predetermined location (e.g., a famous restaurant), the electronic device 101 may change the section intervals of the plurality of first time sections from the first section intervals (e.g., specific time, one hour, two hours, and three hours) into predesignated second section intervals (e.g., specific time, two hours, four hours, and six hours) for the predetermined location. In this case, the electronic device 101 may identify that a location registered as a popular place on a specific application (e.g., map application) installed on the electronic device 101 is the predetermined location. As another example, when the specific location indicated by the second condition is the predetermined location (e.g., famous restaurant), and the identified wait time is less than a predetermined time (e.g., 20 minutes), the electronic device 101 may change the section intervals of the plurality of first time sections from the second section intervals (e.g., specific time, two hours, four hours, and six hours) into predesignated third section intervals (e.g., specific time, one and a half hours, three hours, and four and a half hours) for less than the predetermined time. In the above-described examples, when the location is a popular place, but the wait time is short, the electronic device 101 may provide relatively shorter section intervals than when the wait time is long.

Figure 9:
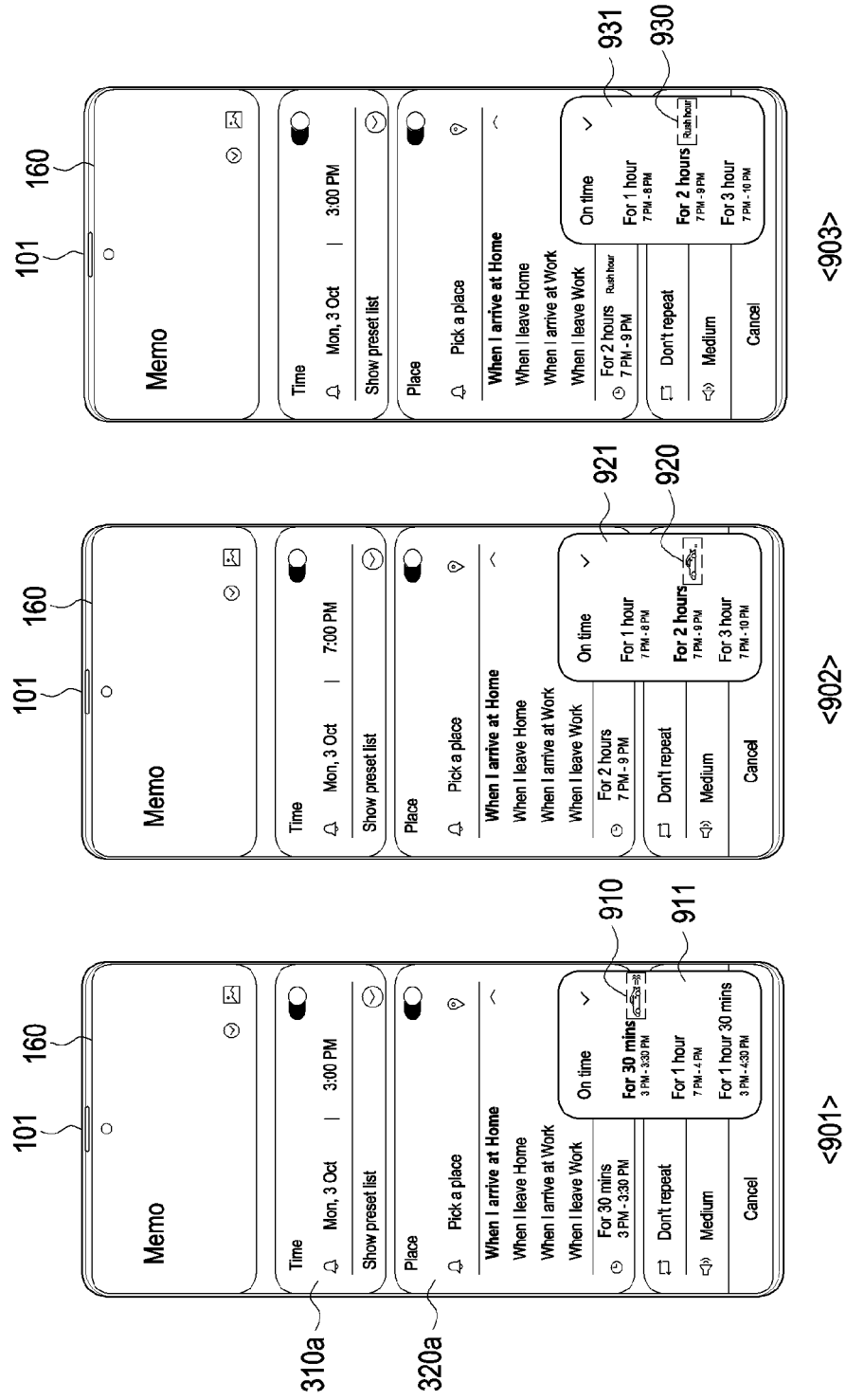
FIG. 9 is a view illustrating an operation in which an electronic device displays a recommendation indicator according to an embodiment of the disclosure.

FIG. 9 is a view illustrating an operation in which an electronic device (e.g., the electronic device 101 of FIG. 1) displays a recommendation indicator according to an embodiment of the disclosure.

Referring to FIG. 9, the electronic device 101 (e.g., the processor 120 of FIG. 1) may control the display module 160 to display a first object (e.g., the first object 310 of FIG. 3A) for setting a first condition to provide a notification and a second object (e.g., the second object 320 of FIG. 3A) for setting a second condition to provide a notification.

According to various embodiments, the electronic device 101 (e.g., the processor 120 of FIG. 1) may set the first condition based on the first input obtained through the activated first object (e.g., the activated first object 310a of FIG. 3A) and set the second condition based on the second input obtained through the activated second object (e.g., the activated second object 320a of FIG. 3A). For example, referring to <901>, the electronic device 101 may set the first condition (e.g., 3:00 PM October 3) based on the first input obtained through the activated first object 310a and set the second condition (e.g., when arriving home) based on the second input obtained through the activated second object 320a.

According to various embodiments, the electronic device 101 (e.g., the processor 120 of FIG. 1) may determine a plurality of first time sections using the first condition, based on the first condition and the second condition being set. According to an embodiment, the electronic device 101 may determine a plurality of first time sections using the first condition, based on whether the specific time indicated by the first condition is included in a predetermined time range. For example, referring to <901>, unless the specific time (e.g., 3:00 PM October 3) indicated by the first condition is included in the predetermined time range (e.g., evening commute time (5:00 PM to 8:00 PM)), the electronic device 101 may determine a plurality of first time sections having section intervals (e.g., on time, 30 minutes, one hour, and one and a half hours). As another example, referring to <902> and <903>, when the specific time (e.g., 7:00 PM October 3) indicated by the first condition is included in the predetermined time range (e.g., evening commute time (5:00 PM to 8:00 PM)), the electronic device 101 may determine a plurality of first time sections having extended section intervals (e.g., on time, one hour, two hours, and three hours) longer than the default section intervals.

According to various embodiments, the electronic device 101 (e.g., the processor 120 of FIG. 1) may control the display module 160 to display a third object for selecting one time section from the plurality of first time sections. For example, referring to <901>, the electronic device 101 may display, through the display module 160, a third object 911 for selecting one time section from the plurality of first time sections having the section intervals (e.g., on time, 30 minutes, one hour, and one and a half hours). As another example, referring to <902> and <903>, the electronic device 101 may display, through the display module 160, third objects 921 and 931 for selecting one time section from the plurality of first time sections having extended section intervals (e.g., on time, one hour, two hours, and three hours) different from the default section interval in <901>. According to an embodiment, the electronic device 101 may determine a recommendation time section from the plurality of first time sections and display a recommendation indicator in the position adjacent to the item displaying the recommendation time section in the third object 510. For example, referring to <901>, the electronic device 101 may display the recommendation indicator 910 in the position adjacent to the item displaying the recommendation time section (e.g., 3:00 PM to 3:30 PM) in the third object 510. The recommendation indicator is an object for intuitively representing the basis (e.g., the traffic is light) for recommending the recommendation time section and may be set as various ones by the user or the manufacturer of the electronic device 101. As another example, referring to <902> and <903>, the electronic device 101 may display recommendation indicators 920 and 930 to intuitively represent the basis (e.g., traffic is heavy) for recommending the recommendation time section in the position adjacent to the item displaying the recommendation time section (e.g., 7:00 PM to 9:00 PM) in the third object 510.

According to an embodiment, the electronic device 101 may differently display the recommendation time section and the default time section automatically applied to the third selection item (e.g., the third selection item of FIG. 3A) from the plurality of first time sections. According to an embodiment, the electronic device 101 may apply first shading or first highlight to the text indicating the default time section or display a first indicator in the position adjacent to the item representing the default time section. According to an embodiment, the electronic device 101 may apply second shading or second highlight, different from the first shading or first highlight, to the text indicating the recommendation time section or display a second indicator, different from the first indicator, in the position adjacent to the item representing the recommendation time section. For example, referring to <802>, the electronic device 101 may apply the first highlight to the text in the default time section (e.g., 7:00 PM to 11:00 PM) and display the recommendation indicator in the adjacent position in the recommendation time section (e.g., 7:00 PM to 1:00 AM).

Figure 10:
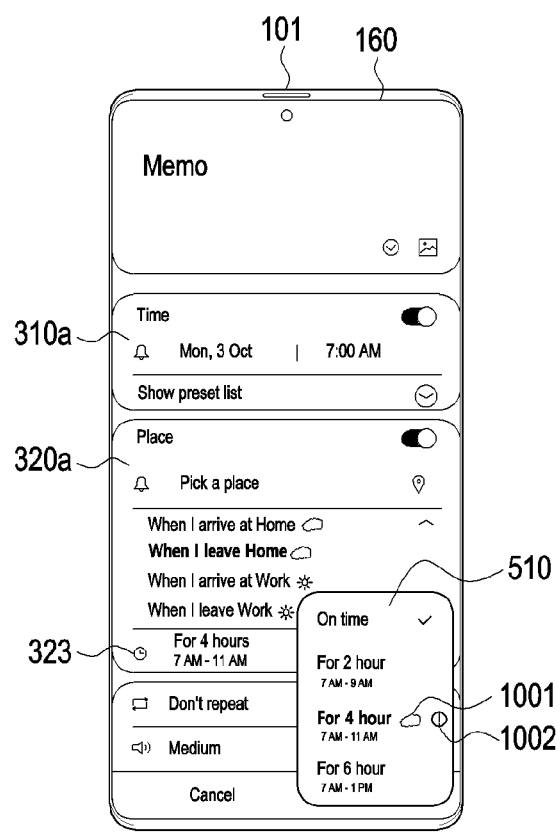
FIG. 10 is a view illustrating an operation in which an electronic device provides a recommendation time section in an object according to an embodiment of the disclosure.

FIG. 10 is a view illustrating an operation in which an electronic device (e.g., the electronic device 101 of FIG. 1) provides a recommendation time section in an object according to an embodiment of the disclosure.

Referring to FIG. 10, the electronic device 101 (e.g., the processor 120 of FIG. 1) may control the display (e.g., the display module 160 of FIG. 1) to display a first object (e.g., the first object 310 of FIG. 3A) for setting a first condition to provide a notification and a second object (e.g., the second object 320 of FIG. 3A) for setting a second condition to provide a notification. According to various embodiments, the electronic device 101 may display the first object and the second object on the display module 160 using the method described in connection with operation 201 of FIG. 2.

According to various embodiments, the electronic device 101 (e.g., the processor 120 of FIG. 1) may set the first condition based on the first input obtained through the activated first object (e.g., the activated first object 310a of FIG. 3A) and set the second condition based on the second input obtained through the activated second object (e.g., the activated second object 320a of FIG. 3A). According to various embodiments, the electronic device 101 may perform the operation of setting the first condition and second condition using the method described in connection with operation 203 of FIG. 2.

According to various embodiments, the electronic device 101 (e.g., the processor 120 of FIG. 1) may determine a plurality of first time sections using the first condition, based on the first condition and the second condition being set.

According to an embodiment, the electronic device 101 may determine the plurality of first time sections using the first condition and context information. For example, referring to FIG. 10, when (1) the traffic information between the specific location indicated by the second condition and the current location of the electronic device 101 in the first condition is identified as 'heavy,' and (2) the weather forecast information in the specific location in the first condition is identified as 'cloudy' in a state in which the first condition (e.g., 7:00 AM October 3) and the second condition (e.g., when arriving at work) have been set, the electronic device 101 may change the section intervals of the plurality of first time sections from the first section intervals (e.g., on time, one hour, two hours, and three hours), which are the default section intervals, to the second section intervals (e.g., on time, two hours, four hours, and six hours) longer than the first section intervals.

According to an embodiment, the electronic device 101 may identify the recommendation time section from the plurality of first time sections and automatically apply the recommendation time section, as the default value of the time selection item (e.g., the third selection item 323 of FIG. 3A) of the activated second object 320a. For example, referring to FIG. 10, the electronic device 101 may identify the recommendation time section (e.g., 7:00 AM to 11:00 AM) from the plurality of first time sections and automatically apply the recommendation time section, as the default value of the third selection item 323.

According to an embodiment, the electronic device 101 may display at least one recommendation indicator in the position adjacent to the item representing the recommendation time section in the third object (e.g., the third object 510 of FIG. 5B). For example, referring to FIG. 10, the electronic device 101 may display a first recommendation indicator 1001 indicating that the weather is cloudy and a second recommendation indicator 1002 indicating that the traffic is heavy) in the position adjacent to the item representing the recommendation time section (e.g., 7:00 AM to 11:00 AM) in the third object 510.

Figure 11:
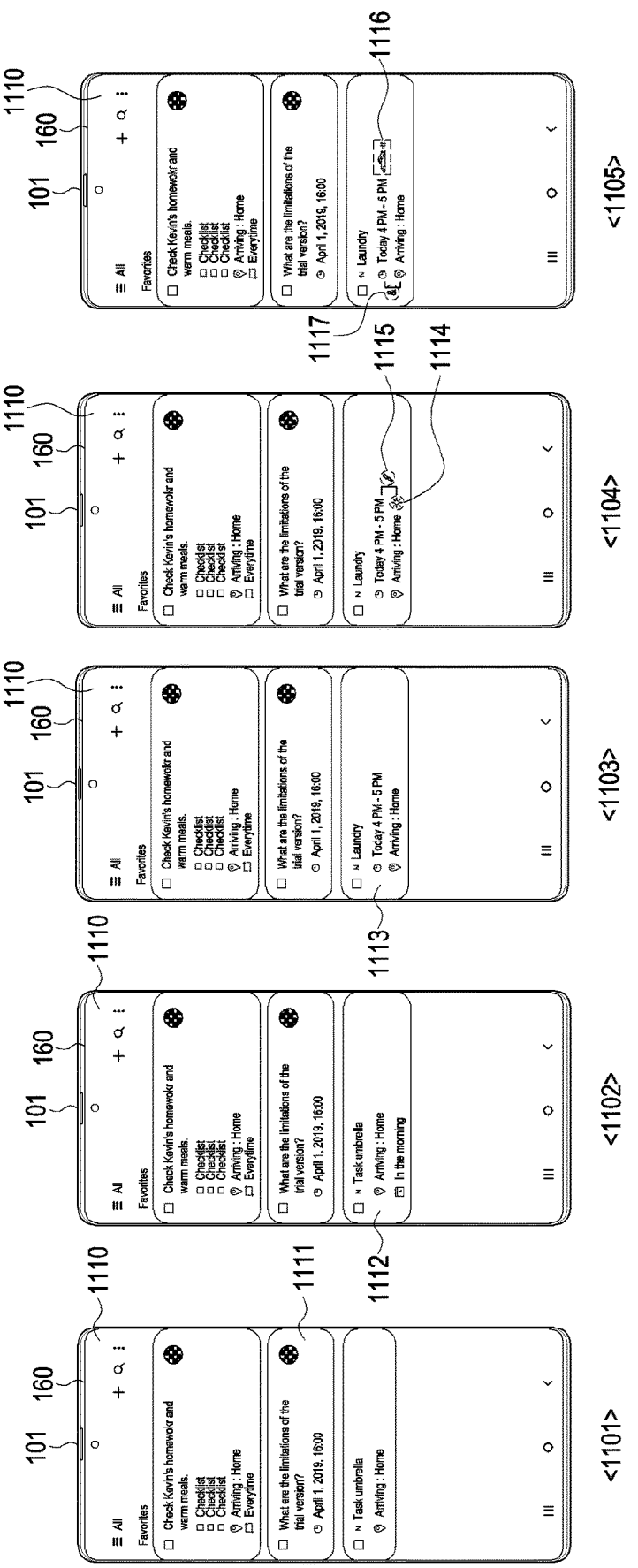
FIG. 11 is a view illustrating an operation in which an electronic device displays a notification information object corresponding to a notification condition according to an embodiment of the disclosure.

FIG. 11 is a view illustrating an operation in which an electronic device (e.g., the electronic device 101 of FIG. 1) displays a notification information object corresponding to a notification condition according to an embodiment of the disclosure.

Referring to FIG. 11, the electronic device 101 (e.g., the processor 120 of FIG. 1) may control the display module 160 to display a notification information object corresponding to a specific notification condition based on the specific notification condition being determined.

According to an embodiment, based on the second condition being not set while the first condition is set, the electronic device 101 may determine a first notification condition and display, through the display module 160, a notification list including a first notification information object corresponding to the first notification condition. For example, referring to <1101>, based on the second condition being not set while the first condition (e.g., Apr. 1, 2019, 16:00) is set, the electronic device 101 may determine the first notification condition using the first condition and display, on the display module 160, the notification list 1110 including the first notification information object 1111 corresponding to the first notification condition. In this case, the first notification information object 1111 may include the first condition.

According to an embodiment, based on the first condition being not set while the second condition is set, the electronic device 101 may determine a second notification condition and display, through the display module 160, a notification list 1110 including a second notification information object corresponding to the second notification condition. For example, referring to <1102>, based on the first condition being not set while the second condition (e.g., when coming back home) is set, the electronic device 101 may determine a second notification condition using the second condition (e.g., when coming back home) and a first specific time section (e.g., in the morning) selected from the predetermined plurality of first time sections and display, on the display module 160, the notification list 1110 including the second notification information object 1112 corresponding to the second notification condition. In this case, the second notification information object 1112 may display the second condition and the first specific time section.

According to an embodiment, based on the first condition and the second condition being set, the electronic device 101 may determine a third notification condition and display, through the display module 160, a notification list 1110 including a third notification information object corresponding to the third notification condition. For example, referring to <1103>, based on the first condition and the second condition (e.g., when coming back home) being set, the electronic device 101 may determine a third notification condition using the second condition and a second specific time section (e.g., today 4 PM to 5 PM) selected from the predetermined plurality of second time sections and display, on the display module 160, the notification list 1110 including the third notification information object 1113 corresponding to the third notification condition. In this case, the third notification information object 1113 may display the second condition and the second specific time section. According to an embodiment, the electronic device 101 may display a context information indicator indicating information used to determine the plurality of first time sections in the third notification object 1113. For example, referring to <1104>, the electronic device 101 may display, in the third notification object 1113, a context information indicator 1114 indicating the weather forecast information in the specific location (e.g., home) indicated by the second condition in the first condition. According to an embodiment, the electronic device 101 may display, in the third notification information object 1113, an association indicator to indicate that the second condition and the second specific time section are associated with each other. For example, referring to <1104>, the electronic device 101 may display, in the third notification information object 1113, an association indicator 1115 to indicate that the second condition and the second specific time section are associated with each other. According to an embodiment, the electronic device 101 may display a recommendation indicator indicating the information used to determine the recommendation time section in the third notification information object 1113. For example, referring to <1105>, the electronic device 101 may display, in the third notification information object 1113, the recommendation indicator 1116 indicating the information (e.g., the traffic is light) used to determine the recommendation time section (e.g., 4:00 PM to 5:00 PM) and the association indicator 1117 indicating that the second condition and the second specific time section are associated with each other.

Figure 12:
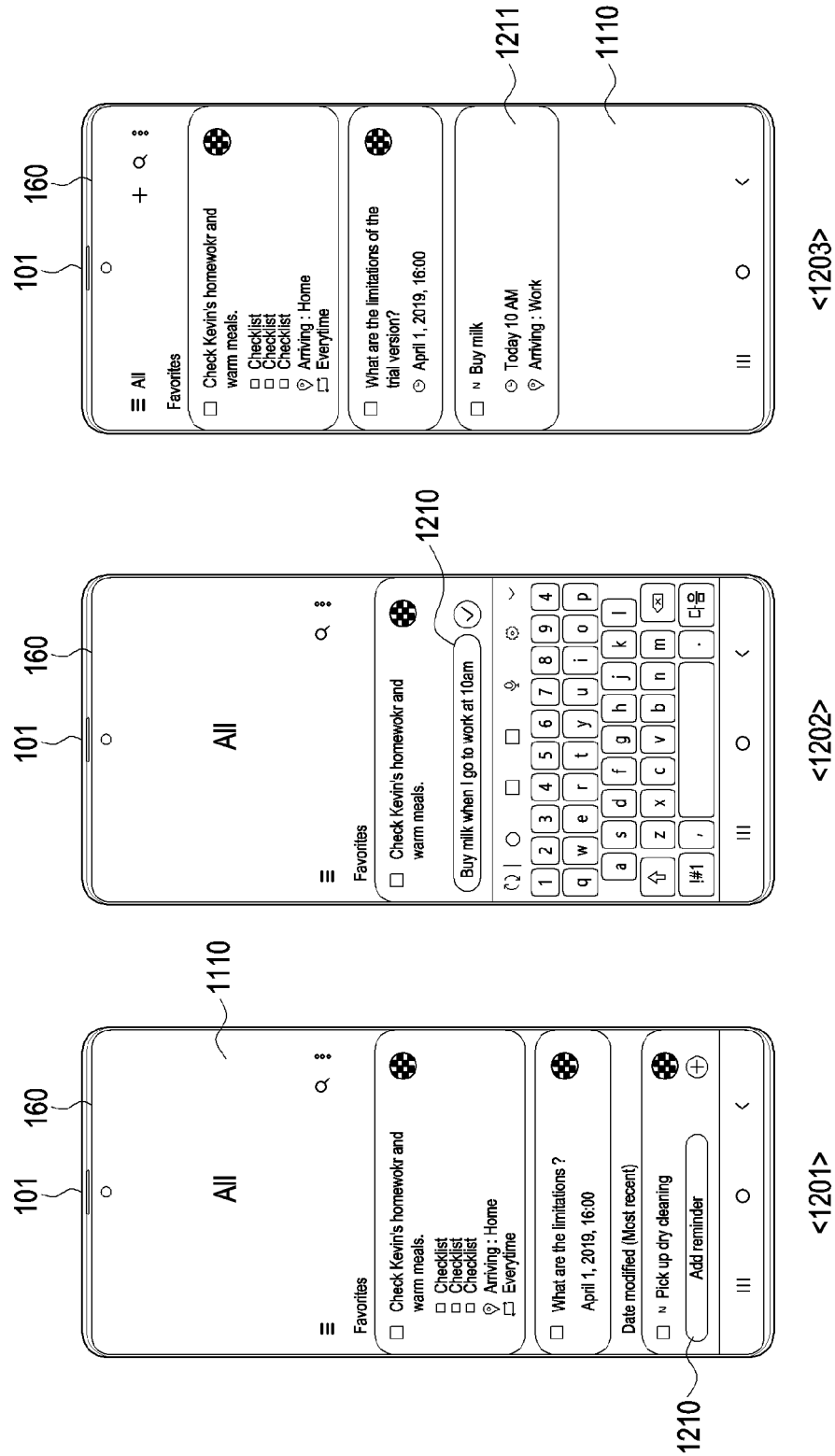
FIG. 12 is a view illustrating a first embodiment in which an electronic device displays a notification information object corresponding to a notification condition according to an embodiment of the disclosure.

FIG. 12 is a view illustrating a first embodiment in which an electronic device (e.g., the electronic device 101 of FIG. 1) displays a notification information object corresponding to a notification condition according to an embodiment of the disclosure.

Referring to FIG. 12, the electronic device 101 (e.g., the processor 120 of FIG. 1) may display, on the display (e.g., the display module 160 of FIG. 1), a notification list (e.g., the notification list 1110 of FIG. 11) based on execution of a notification application. For example, referring to FIG. 12, the electronic device 101 may display, on the display module 160, the notification list 1110 including a notification add object 1210 (e.g., quick add object) for adding a notification in text, based on the execution of the notification application.

According to various embodiments, the electronic device 101 (e.g., the processor 120 of FIG. 1) may receive text data regarding a notification condition from the user, through the notification add object 1210. For example, referring to FIG. 12, the electronic device 101 may receive text data (e.g., buy milk when I go to work at 10 am) regarding the notification condition through the notification add object 1210.

According to various embodiments, the electronic device 101 (e.g., the processor 120 of FIG. 1) may perform natural language analysis on the text data based on a request for adding the input text data. The electronic device 101 may determine the notification condition based on the result of analysis and display, on the display module 160, the notification list 1110 including the notification information object 1211 corresponding to the notification condition.

Figure 13:
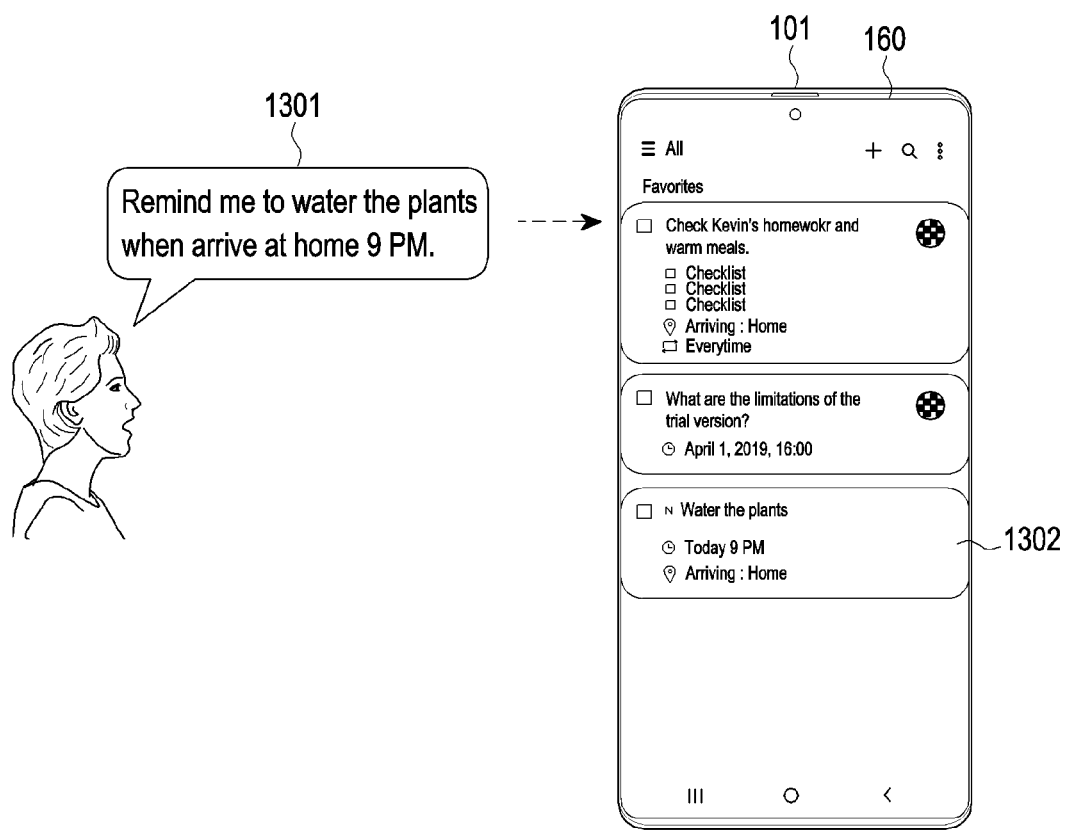
FIG. 13 is a view illustrating a second embodiment in which an electronic device displays a notification information object corresponding to a notification condition according to an embodiment of the disclosure.

FIG. 13 is a view illustrating a second embodiment in which an electronic device (e.g., the electronic device 101 of FIG. 1) displays a notification information object corresponding to a notification condition according to an embodiment of the disclosure.

Referring to FIG. 13, the electronic device 101 (e.g., the processor 120 of FIG. 1) may obtain a user utterance for adding a notification condition, based on the execution of the notification application. For example, referring to FIG. 13, the electronic device 101 may obtain a user utterance 1301 from the user while executing the notification application. According to an embodiment, the electronic device 101 may identify the first condition and the second condition necessary to determine the notification condition by obtaining the text corresponding to the user utterance 1301 and performing natural language analysis on the text. According to an embodiment, the electronic device 101 may determine the notification condition using the first condition and the second condition, based on the first condition and second condition identified from the user utterance 1301. For example, referring to FIG. 13, the electronic device 101 may determine the notification condition (e.g., output a notification when arriving home at 9:00 PM) using the first condition (e.g., today 9:00 PM) and the second condition (e.g., when arriving home) from the user utterance 1301 and display the notification information object 1302 corresponding to the notification condition on the display module 160.

According to an embodiment, the electronic device 101 may determine the plurality of first time sections using the first condition, based on the first condition and second condition identified from the user utterance 1301 and identify a recommendation time section from the plurality of first time sections. According to an embodiment, the electronic device 101 may determine the notification condition using the recommendation time section and the second condition and display the notification information object corresponding to the notification condition on the display module 160.

Figure 14A:
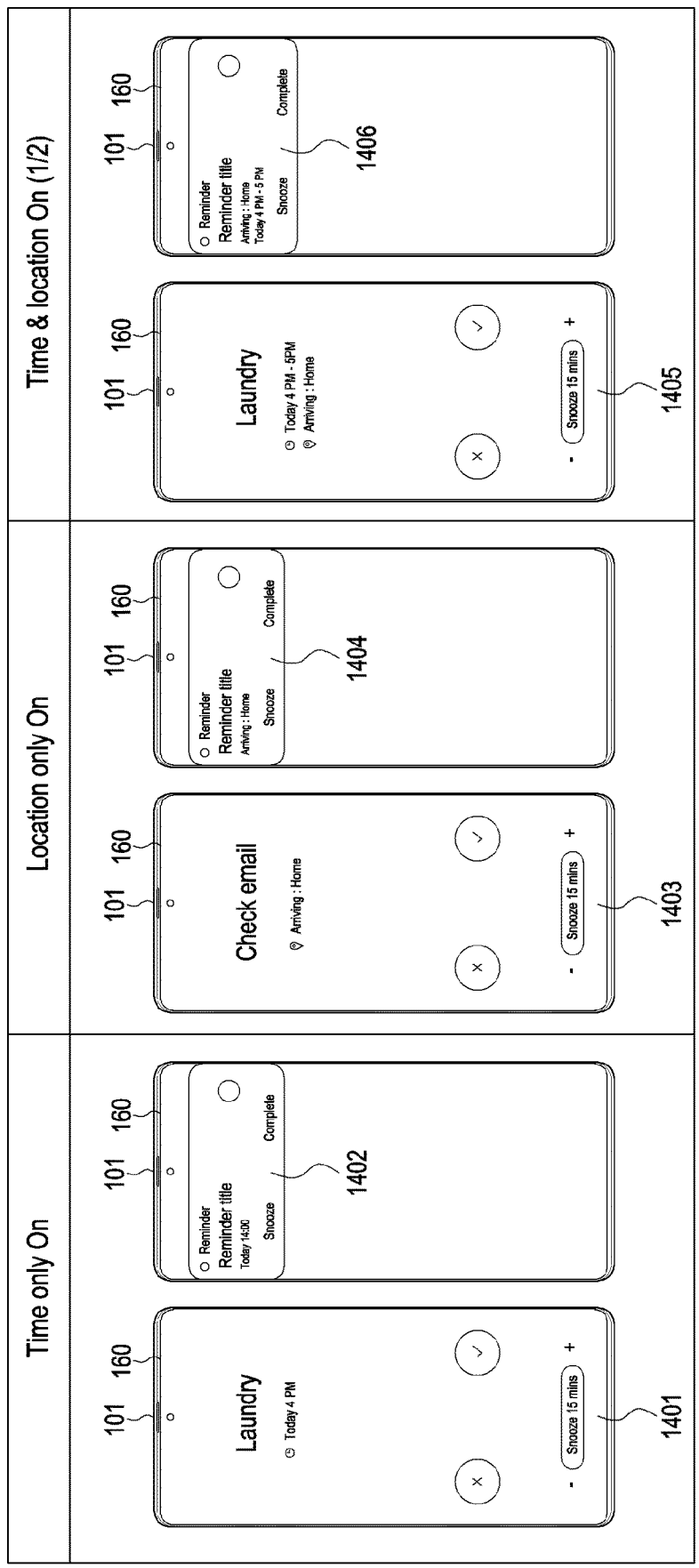
FIG. 14A is a view illustrating a first embodiment in which an electronic device outputs a notification when a notification condition is met according to an embodiment of the disclosure.

FIG. 14A is a view illustrating a first embodiment in which an electronic device (e.g., the electronic device 101 of FIG. 1) outputs a notification when a notification condition is met according to an embodiment of the disclosure.

Figure 14B:
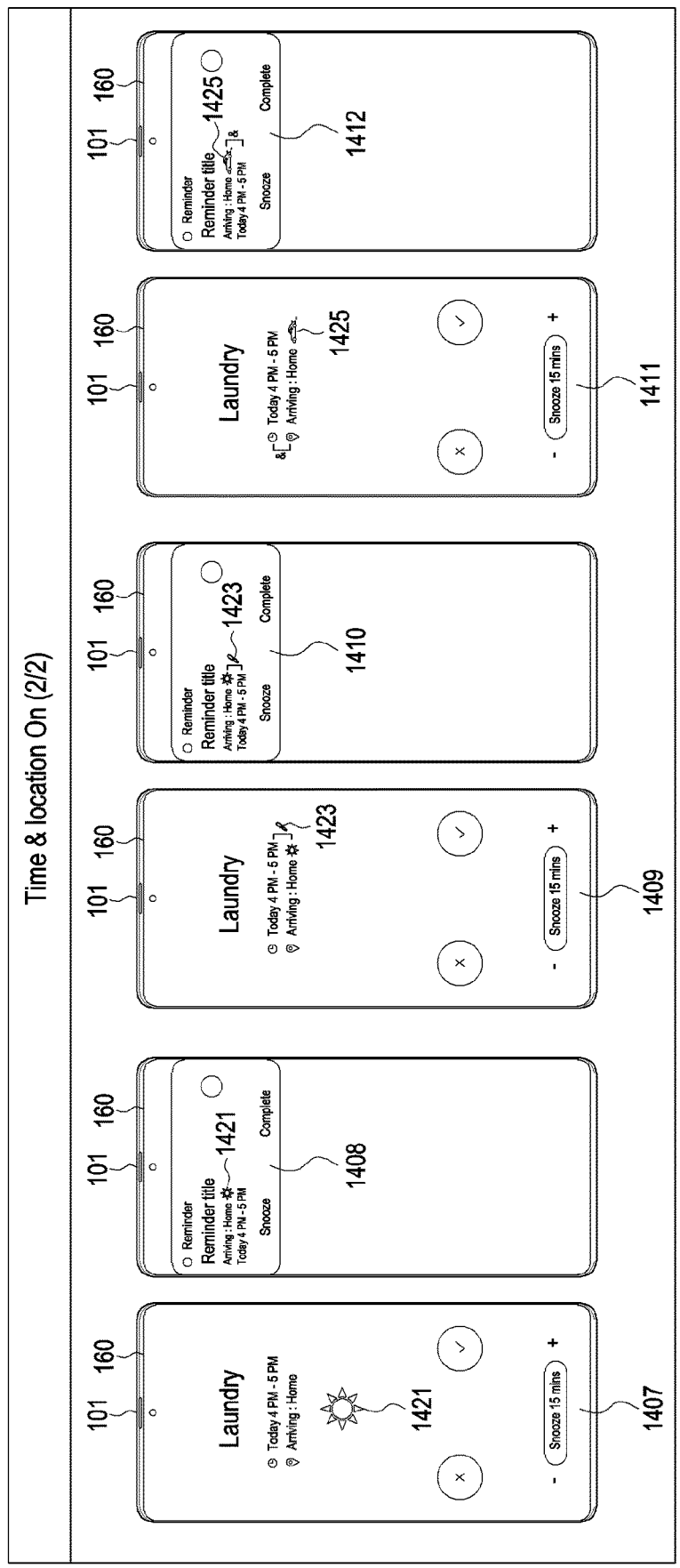
FIG. 14B is a view illustrating a second embodiment in which an electronic device outputs a notification when a notification condition is met according to an embodiment of the disclosure.

FIG. 14B is a view illustrating a second embodiment in which an electronic device (e.g., the electronic device 101 of FIG. 1) outputs a notification when a notification condition is met according to an embodiment of the disclosure.

Referring to FIGS. 14A and 14B, the electronic device 101 (e.g., the processor 120 of FIG. 1) may determine whether the notification condition set in the electronic device 101 is met. According to an embodiment, based on the second condition (e.g., location condition) being not set while the first condition (e.g., time condition) is set, the electronic device 101 may determine a first notification condition and, if the specific time specified by the first condition arrives, determine that the first notification condition is met. According to an embodiment, based on the first condition (e.g., time condition) being not set while the second condition (e.g., location condition) is set, the electronic device 101 may determine a second notification condition and, if it is present in the specific location indicated by the second condition, moves to the specific location, or leaves the specific location, within the first specific time section selected from a predetermined plurality of first time sections, determine that the second notification condition is met. According to an embodiment, based on the first condition (e.g., time condition) and second condition (e.g., location condition) being set, the electronic device 101 may determine a third notification condition and, if it is present in the specific location indicated by the second condition, moves to the specific location, or leaves the specific location within the second specific time section selected from the plurality of second time sections, determine that the third notification condition is met.

According to various embodiments, the electronic device 101 (e.g., the processor 120 of FIG. 1) may output a specific notification corresponding to the specific notification condition, based on the specific notification condition being met. According to an embodiment, when the first notification condition is met, the electronic device 101 may output a first notification corresponding to the first notification condition based on the output strength (e.g., strong/medium/light) of a preset notification. For example, referring to FIG. 14A, when the first notification condition for the case where the first condition alone is set is met, the electronic device 101 may display a notification screen 1401 through the entire area of the display module 160 and output a notification sound during a first time based on the output strength (e.g., strong) of the preset notification. As another example, referring to FIG. 14A, when the first notification condition for the case where the first condition alone is set is met, the electronic device 101 may display a notification screen 1401 through the entire area of the display module 160 while outputting a notification sound during a second time shorter than the first time based on the output strength (e.g., medium) of the preset notification. As another example, referring to FIG. 14A, when the first notification condition for the case where the first condition alone is set is met, the electronic device 101 may display a notification screen 1402 through a partial area of the display module 160 while outputting a notification sound during a third time shorter than the second time, or without outputting a notification sound, based on the output strength (e.g., light) of the preset notification. The embodiment in which the screen configuration and section of the notification sound differ based on the output strength of the notification may be likewise applied to the second notification condition and the third notification condition.

According to an embodiment, when the first notification condition is met, the electronic device 101 may display a notification screen including the first condition on the display module 160. For example, referring to FIG. 14A, when the first notification condition is met, the electronic device 101 may display notification screens 1401 and 1402 including the first condition (e.g., today 4:00 PM) on the display module 160.

According to an embodiment, when the second notification condition is met, the electronic device 101 may display a notification screen including the second condition on the display module 160. For example, referring to FIG. 14A, when the second notification condition is met, the electronic device 101 may display notification screens 1403 and 1404 including the second condition (e.g., arriving: home) on the display module 160. In this case, the electronic device 101 may display only the second condition without displaying information regarding the first specific time section used to determine the second notification condition.

According to an embodiment, when the third notification condition is met, the electronic device 101 may display a notification screen including the first condition and the second condition on the display module 160. For example, referring to FIG. 14A, when the third notification condition is met, the electronic device 101 may display, on the display module 160, notification screens 1405 and 1406 including the second specific time section (e.g., today 4:00 PM to 5:00 PM) and the second condition (e.g., arriving: home).

According to an embodiment, when the third notification condition is met, the electronic device 101 may display, on the display module 160, a notification screen including context information indicator indicating the information used to determine the plurality of second time sections. For example, referring to FIG. 14B, when the third notification condition is met, the electronic device 101 may display, on the display module 160, notification screens 1407 and 1408 including the context information indicator 1421 indicating the weather forecast information in the specific location (e.g., home) indicated by the second condition in the first condition.

According to an embodiment, when the third notification condition is met, the electronic device 101 may display, on the display module 160, a notification screen including an association indicator to indicate that the second condition and the second specific time section are associated with each other. For example, referring to FIG. 14B, when the third notification condition is met, the electronic device 101 may display, on the display module 160, notification screens 1409 and 1410 including the association indicator 1423 to indicate that the second condition and the second specific time section are associated with each other.

According to an embodiment, when the third notification condition is met, the electronic device 101 may display, on the display module 160, a notification screen including a recommendation indicator indicating the information used to determine a recommendation time section. For example, referring to FIG. 14B, when the third notification condition is met, the electronic device 101 may display, on the display module 160, notification screens 1411 and 1412 including the recommendation indicator 1425 indicating the information used to determine the recommendation time section from the plurality of second time sections.

According to an embodiment, when a specific notification condition is met while a predetermined application is running, the electronic device 101 may output a specific notification having a predetermined output strength regardless of the output strength (e.g., strong/medium/light) of the preset notification. For example, referring to FIG. 14B, when a third notification condition is met while the predetermined application (e.g., video application) is running, the electronic device 101 may display the notification screens 1408, 1410, and 1412 through a partial area of the display module 160, based on the predetermined output strength (e.g., light).

Figure 15:
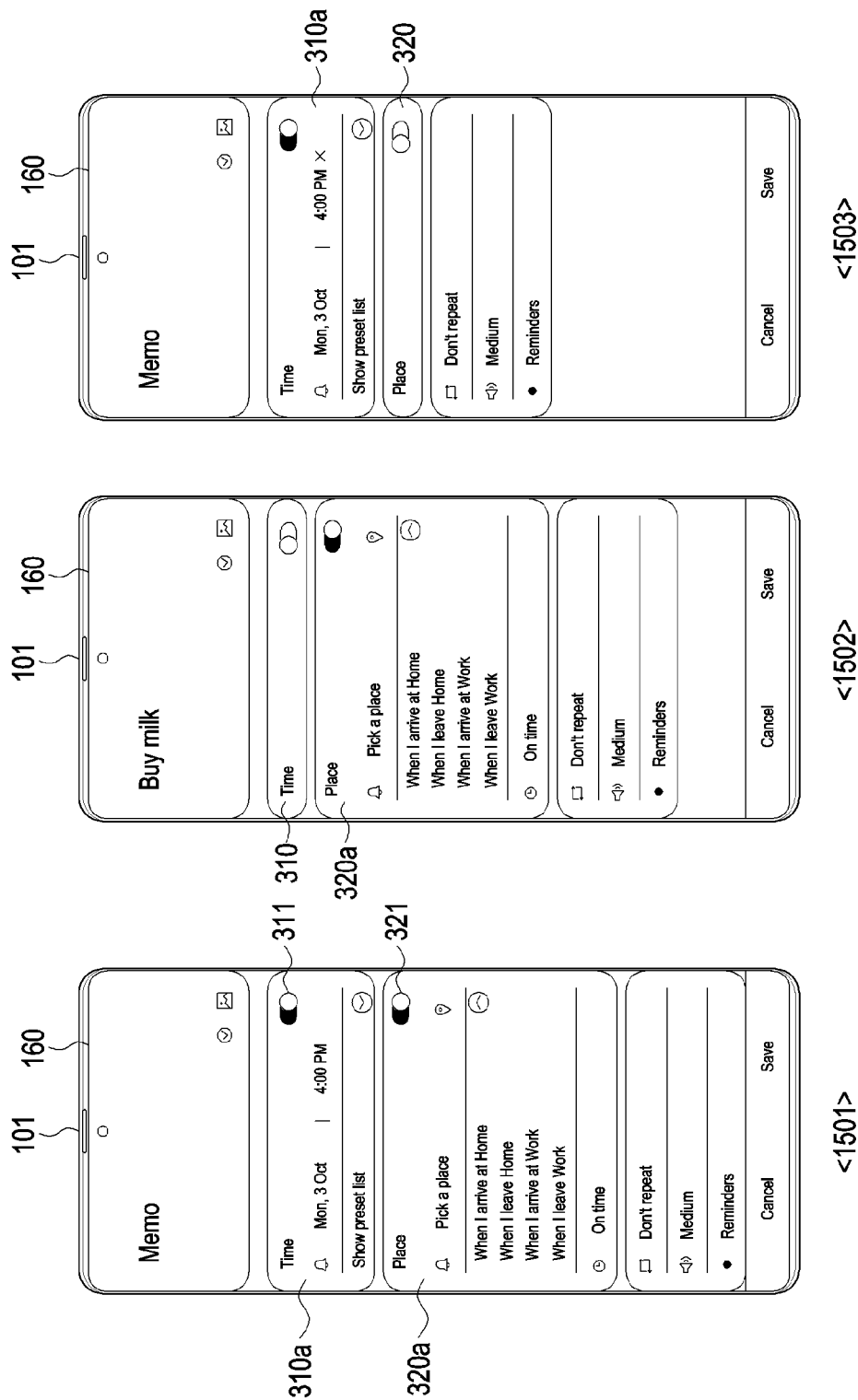
FIG. 15 is a view illustrating an operation in which an electronic device deactivates at least one of a first condition or a second condition according to an embodiment of the disclosure.

FIG. 15 is a view illustrating an operation in which an electronic device (e.g., the electronic device 101 of FIG. 1) deactivates at least one of a first condition or a second condition according to an embodiment of the disclosure.

Referring to FIG. 15, the electronic device 101 (e.g., the processor 120 of FIG. 1) may deactivate at least one of an activated first object (e.g., the activated first object 310a of FIG. 3A) or an activated second object (e.g., the activated second object 320a of FIG. 3A) based on a user input. According to an embodiment, the electronic device 101 may deactivate the activated first object 310a based on a user input. For example, referring to <1501> and <1502>, upon obtaining a user input (e.g., tap) to a button 311 (e.g., toggle button) of the activated first object 310a, the electronic device 101 may deactivate the activated first object 310a and, in response to the deactivated state of the activated first object 310a, refrain from displaying the first selection item (e.g., the first selection item 312 of FIG. 3A) for setting the first condition. According to an embodiment, the electronic device 101 may deactivate the activated second object 320a based on a user input. For example, referring to <1501> and <1503>, upon obtaining a user input (e.g., tap) to a button 321 (e.g., toggle button) of the activated second object 320a, the electronic device 101 may deactivate the activated second object 320a and, in response to the deactivated state of the activated second object 320a, refrain from displaying the second selection item (e.g., the second selection item 322 of FIG. 3A) and third selection item (e.g., the third selection item 323 of FIG. 3A) for setting the second condition.

Figure 16:
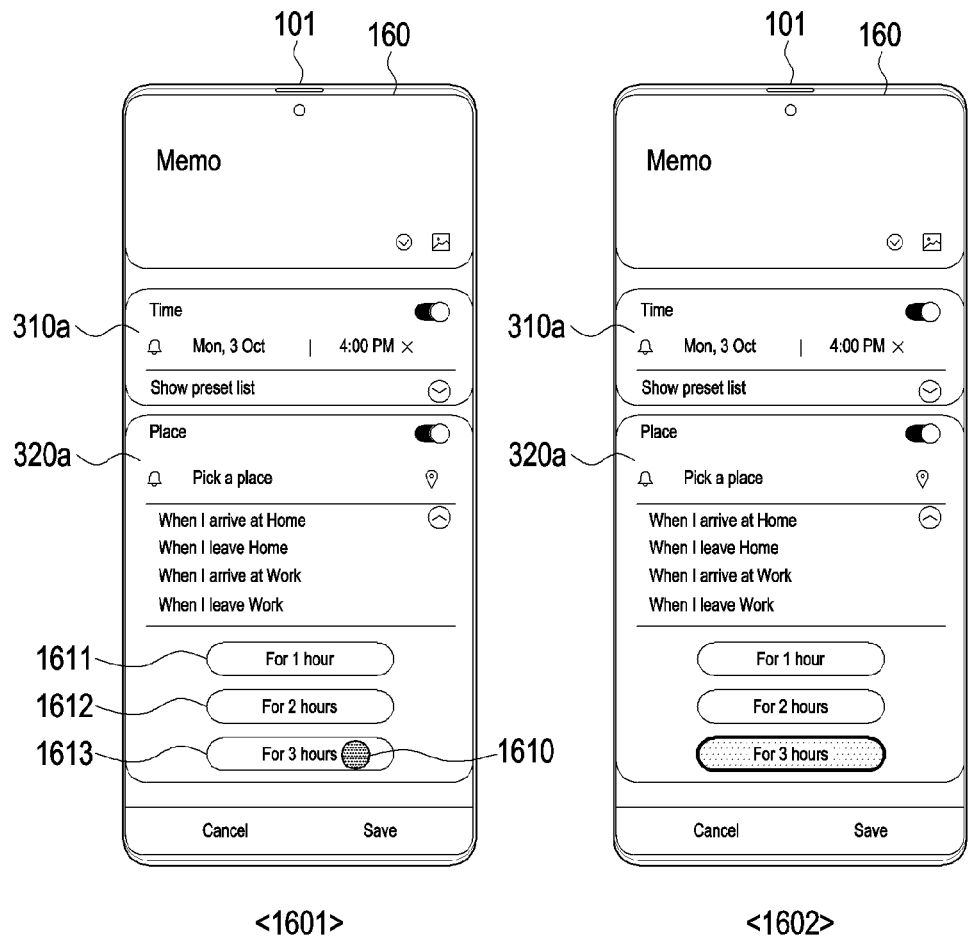
FIG. 16 is a view illustrating a first embodiment in which an electronic device identifies selection of a one time section from a plurality of first time sections according to an embodiment of the disclosure.

FIG. 16 is a view illustrating a first embodiment in which an electronic device (e.g., the electronic device 101 of FIG. 1) identifies selection of a first one from a plurality of first time sections according to an embodiment of the disclosure.

Figure 17:
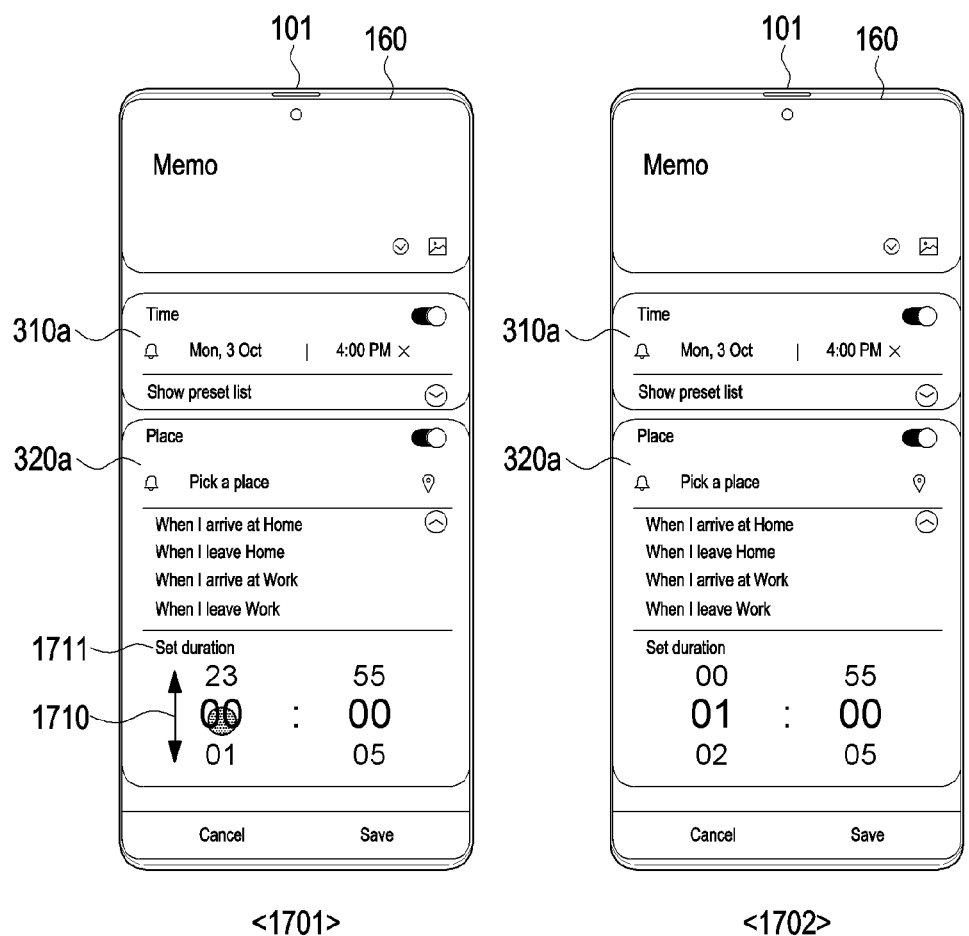
FIG. 17 is a view illustrating a second embodiment in which an electronic device identifies selection of a first one time section from a plurality of first time sections according to an embodiment of the disclosure.

FIG. 17 is a view illustrating a second embodiment in which an electronic device (e.g., the electronic device 101 of FIG. 1) identifies selection of a first one from a plurality of first time sections according to an embodiment of the disclosure.

Figure 18:
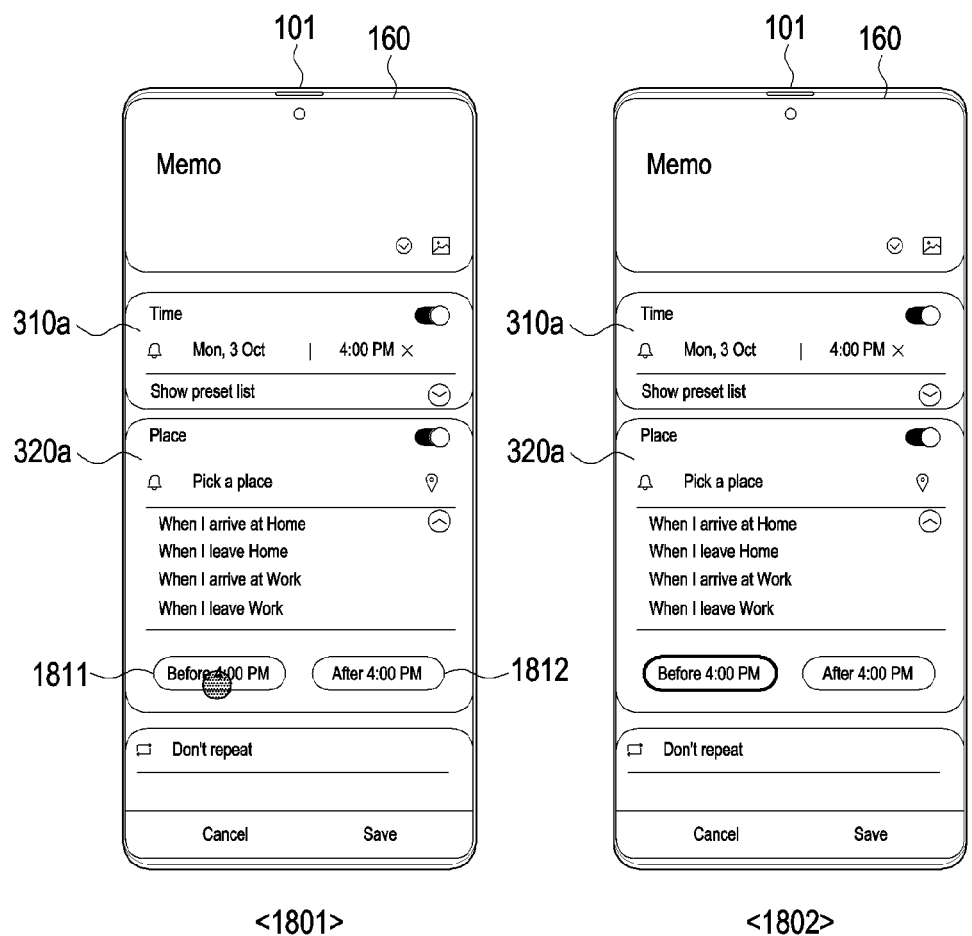
FIG. 18 is a view illustrating a third embodiment in which an electronic device identifies selection of a first one time section from a plurality of first time sections according to an embodiment of the disclosure.

FIG. 18 is a view illustrating a third embodiment in which an electronic device (e.g., the electronic device 101 of FIG. 1) identifies selection of a first one from a plurality of first time sections according to an embodiment of the disclosure.

Referring to FIGS. 16, 17 and 18, the electronic device 101 (e.g., the processor 120 of FIG. 1) may control the display (e.g., the display module 160 of FIG. 1) to display a first object (e.g., the first object 310 of FIG. 3A) for setting a first condition to provide a notification and a second object (e.g., the second object 320 of FIG. 3A) for setting a second condition to provide a notification. According to various embodiments, the electronic device 101 may display the first object and the second object on the display module 160 using the method described in connection with operation 201 of FIG. 2.

According to various embodiments, the electronic device 101 (e.g., the processor 120 of FIG. 1) may set the first condition based on the first input obtained through the activated first object (e.g., the activated first object 310a of FIG. 3A) and set the second condition based on the second input obtained through the activated second object (e.g., the activated second object 320a of FIG. 3A). According to various embodiments, the electronic device 101 may set the first condition and second condition using the method described in connection with operation 203 of FIG. 2.

According to various embodiments, the electronic device 101 (e.g., the processor 120 of FIG. 1) may determine a plurality of first time sections using the first condition, based on the first condition and the second condition being set. According to an embodiment, the electronic device 101 may determine the plurality of first time sections using the method described in connection with operation 505 of FIG. 5A.

According to various embodiments, the electronic device 101 (e.g., the processor 120 of FIG. 1) may identify a first time section from the plurality of first time sections.

According to an embodiment, the electronic device 101 may control the display module 160 to display a third object for selecting one time section from the plurality of first time sections. For example, referring to <1601>, the electronic device 101 may control the display module 160 to display a button-shaped first object 1611, second object 1612, and third object 1613 for selecting one time section from the plurality of first time sections. As another example, referring to <1701>, the electronic device 101 may control the display module 160 to display a wheel-shaped object 1711 to select one time section. As another example, referring to <1801>, the electronic device 101 may control the display module 160 to display a first object 1811 indicating a previous section (e.g., before 4:00 PM) and a second object 1820 indicating a subsequent section (e.g., after 4:00 PM) with respect to the first condition (e.g., 4:00 PM October 3).

According to an embodiment, the electronic device 101 may identify selection of the first time section based on a third input obtained through the third object for selecting one time section. For example, referring to <1601> and <1602>, the electronic device 101 may identify selection of the first time section (e.g., three hours) based on a user input 1610 (e.g., tap) for selecting the third object 1613. As another example, referring to <1701> and <1702>, the electronic device 101 may identify selection of the first time section (e.g., one hour) based on a user input 1710 (e.g., drag) for adjusting a wheel-shaped object 1711. As another example, referring to <1801> and <1802>, the electronic device 101 may identify selection of the first time section (e.g., before 4:00 PM October 3) based on a user input for selecting the first object 1811 of the first object 1811 and the second object 1812.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, an electronic device (e.g., the electronic device 101 of FIG. 1) may comprise a display (e.g., the display module 160 of FIG. 1) and a processor (e.g., the processor 120 of FIG. 1). The processor may be configured to control the display to display a first object (e.g., the first object 310 of FIG. 3A) for setting a first condition to provide a notification and a second object (e.g., the second object 320 of FIG. 3A) for setting a second condition to provide the notification, perform at least one of setting the first condition based on a first input obtained through the first object or setting the second condition based on a second input obtained through the second object, and determine a plurality of first time sections using the first condition, based on the first condition and the second condition being set.

According to various embodiments, the processor may be further configured to identify selection of one time section from the plurality of first time sections, and determine a notification condition for providing the notification, using the one time section and the second condition.

According to various embodiments, the processor may be configured to control the display to display a third object (e.g., the third object 510 of FIG. 5) for selecting the one time section from the plurality of first time sections, and identify selection of the one time section based on a third input obtained through the third object.

According to various embodiments, the processor may be further configured to provide the notification corresponding to the notification condition when the notification condition is met.

According to various embodiments, the processor may be further configured to determine the plurality of first time sections, using the first condition and context information.

According to various embodiments, the context information may include at least one of information about a user's preferred location related to the second condition, information about distance between a specific location indicated by the second condition and a current location of the electronic device, information about the user's preferred transportation related to the second condition, traffic information between the specific location and the current location of the electronic device, or weather forecast information in the specific location in the first condition.

According to various embodiments, the processor may be configured to determine the plurality of first time sections, using a user's behavior pattern related to at least one of the first condition or the second condition.

According to various embodiments, the processor may be configured to change a section interval of the plurality of first time sections from a first section interval to a second section interval longer than the first section interval when a specific time indicated by the first condition is within a predetermined period from a time when the first condition is set, and a distance between a specific location indicated by the second condition and a current location of the electronic device is a predetermined distance or more.

According to various embodiments, the processor is configured to change a section interval of the plurality of first time sections from a first section interval to a second section interval longer than the first section interval when weather forecast information in the first condition and second condition corresponds to specific weather information.

According to various embodiments, the processor may be further configured to control the display to display a fourth object for selecting one time section from a plurality of predetermined second time sections, based on the first condition being not set while the second condition is set, identify selection of the one time section based on a fourth input obtained through the fourth object, and determine a first notification condition for providing the notification, using the one time section and the second condition.

According to various embodiments, a method for operating an electronic device may comprise controlling a display of the electronic device to display a first object for setting a first condition to provide a notification and a second object for setting a second condition to provide the notification, performing at least one of setting the first condition based on a first input obtained through the first object or setting the second condition based on a second input obtained through the second object, and determining a plurality of first time sections using the first condition, based on the first condition and the second condition being set.

According to various embodiments, the method may further comprise identifying selection of one time section from the plurality of first time sections and determining a notification condition for providing the notification, using the one time section and the second condition.

According to various embodiments, identifying the selection of the one time section may include controlling the display to display a third object for selecting one time section from the plurality of first time sections and identifying selection of the first time section based on a third input obtained through the third object.

According to various embodiments, the method may further comprise providing the notification corresponding to the notification condition when the notification condition is met.

According to various embodiments, determining the plurality of first time sections may include determining the plurality of first time sections, using the first condition and context information.

According to various embodiments, the context information may include at least one of information about a user's preferred location related to the second condition, information about distance between a specific location indicated by the second condition and a current location of the electronic device, information about the user's preferred transportation related to the second condition, traffic information between the specific location and the current location of the electronic device, or weather forecast information in the specific location in the first condition.

According to various embodiments, determining the plurality of first time sections may include determining the plurality of first time sections, using a user's behavior pattern related to at least one of the first condition or the second condition.

According to various embodiments, determining the plurality of first time sections may include changing a section interval of the plurality of first time sections from a first section interval to a second section interval longer than the first section interval when a specific time indicated by the first condition is within a predetermined period from a time when the first condition is set, and a distance between a specific location indicated by the second condition and a current location of the electronic device is a predetermined distance or more.

According to various embodiments, determining the plurality of first time sections may include changing a section interval of the plurality of first time sections from a first section interval to a second section interval longer than the first section interval when weather forecast information in the first condition and second condition corresponds to specific weather information.

According to various embodiments, the method may further comprise controlling the display to display a fourth object for selecting one time section from a plurality of predetermined second time sections, based on the first condition being not set while the second condition is set, identifying selection of the one time section based on a fourth input obtained through the fourth object, and determining a first notification condition for providing the notification, using the one time section and the second condition.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a display;
    a processor; and
    memory storing instructions which, when executed by the processor, cause the electronic device to:
        control the display to display a first object for setting a time condition to provide a notification and a second object for setting a location condition to provide the notification,
        set the time condition based on a first input obtained through the first object,
        set the location condition based on a second input obtained through the second object,
        based on the time condition being set as a specific time and the location condition being set as a first location, control the display to display a plurality of first time sections where the notification is allowed with respect to the specific time indicated by the time condition, the plurality of first time sections having first time intervals, and
        based on the time condition being set as a specific time and the location condition changing from the first location to a second location, change the first time intervals to second time intervals longer than the first time intervals, and control the display to display a plurality of second time sections having second time intervals,
    wherein the plurality of second time sections include a time section between the specific time and a first time and another time section between the specific time and a second time, and
    wherein the specific time, the first time and the second time are different from each other.

2. The electronic device of claim 1, wherein the instructions, when executed by the processor, cause the electronic device to:
    identify selection of one time section from the plurality of second time sections, and
    determine a notification condition for providing the notification, using the one time section and the location condition.

3. The electronic device of claim 2, wherein the instructions, when executed by the processor, cause the electronic device to:

control the display to display a third object for selecting the one time section from the plurality of second time sections, and identify selection of the one time section based on a third input obtained through the third object.

4. The electronic device of claim 2, wherein the instructions, when executed by the processor, cause the electronic device to:

provide the notification corresponding to the notification condition when the notification condition is met.

5. The electronic device of claim 1, wherein the instructions, when executed by the processor, cause the electronic device to:

determine the plurality of first time sections, using the time condition and context information.

6. The electronic device of claim 5, wherein the context information includes at least one of information about a user's preferred location related to the location condition, information about distance between a specific location indicated by the location condition and a current location of the electronic device, information about the user's preferred transportation related to the location condition, traffic information between the specific location and the current location of the electronic device, or weather forecast information in the specific location corresponding to the time condition.

7. The electronic device of claim 1, wherein the instructions, when executed by the processor, cause the electronic device to:

determine the plurality of first time sections, using a user's behavior pattern related to at least one of the time condition or the location condition.

8. The electronic device of claim 1, wherein the instructions, when executed by the processor, cause the electronic device to:

control the display to display a fourth object for selecting one time section from a plurality of predetermined third time sections, based on the time condition not being set while the location condition is set, identify selection of the one time section based on a fourth input obtained through the fourth object, and determine a first notification condition for providing the notification, using the one time section and the location condition.

9. The electronic device of claim 1, wherein the instructions, when executed by the processor, cause the electronic device to:

control the display to display a third object for selecting one time section from the plurality of second time sections, the third object including at least one indicator positioned next to a recommended time section from among the plurality of second time sections, the at least one indicator displaying information used to determine the recommended time section from among the plurality of second time sections.

10. The electronic device of claim 9, wherein the at least one indicator includes an icon.

11. The electronic device of claim 9, wherein the at least one indicator includes a textual indicator.

12. The electronic device of claim 9, wherein the instructions, when executed by the processor, cause the electronic device to:

control the display to display an association indicator indicating that the one time section and the location condition are associated.

13. A method for operating an electronic device, the method comprising:

controlling a display of the electronic device to display a first object for setting a time condition to provide a notification and a second object for setting a location condition to provide the notification;

setting the time condition based on a first input obtained through the first object;

setting the location condition based on a second input obtained through the second object;

based on the time condition being set as a specific time and the location condition being set as a first location, controlling the display to display a plurality of first time sections where the notification is allowed with respect to the specific time indicated by the time condition, the plurality of first time sections having first time intervals; and based on the time condition being set as a specific time and the location condition changing from the first location to a second location, changing the first time intervals to second time intervals longer than the first time intervals, and controlling the display to display a plurality of second time sections having second time intervals, wherein the plurality of second time sections include a time section between the specific time and a first time and another time section between the specific time and a second time, and wherein the specific time, the first time and the second time are different from each other.

14. The method of claim 13, further comprising:

identifying selection of one time section from the plurality of second time sections; and determining a notification condition for providing the notification, using the one time section and the location condition.

15. The method of claim 14, wherein the identifying of the selection of the one time section includes:

controlling the display to display a third object for selecting the one time section from the plurality of second time sections; and identifying selection of the one time section based on a third input obtained through the third object.

16. The method of claim 14, further comprising providing the notification corresponding to the notification condition when the notification condition is met.

17. The method of claim 13, further comprising:

determining the plurality of first time sections, using the time condition and context information.

18. The method of claim 17, wherein the context information includes, at least one of information about a user's preferred location related to the location condition, information about distance between a specific location indicated by the location condition and a current location of the electronic device, information about the user's preferred transportation related to the location condition, traffic information between the specific location and the current location of the electronic device, or weather forecast information in the specific location corresponding to the time condition.

19. The method of claim 13, wherein the controlling of the display to display the plurality of first time sections includes determining the plurality of first time sections, using a user's behavior pattern related to at least one of the time condition or the location condition.

20. The method of claim 13, further comprising:

controlling the display to display a fourth object for selecting one time section from a plurality of predetermined third time sections, based on the time condition not being set while the location condition is set;

identifying selection of the one time section based on a fourth input obtained through the fourth object; and determining a first notification condition for providing the notification, using the one time section and the location condition.

21. One or more non-transitory computer-readable storage media storing one or more computer programs including computer-executable instructions that, when executed by one or more processors of an electronic device individually or collectively, cause the electronic device to perform operations, the operations comprising:

controlling a display of the electronic device to display a first object for setting a time condition to provide a notification and a second object for setting a location condition to provide the notification;

setting the time condition based on a first input obtained through the first object;

setting the location condition based on a second input obtained through the second object;

based on the time condition being set as a specific time and the location condition being set as a first location, controlling the display to display a plurality of first time sections where the notification is allowed with respect to the specific time indicated by the time condition, the plurality of first time sections having first time intervals; and based on the time condition being set as a specific time and the location condition changing from the first location to a second location, changing the first time intervals to second time intervals longer than the first time intervals, and controlling the display to display a plurality of second time sections having second time intervals, wherein the plurality of second time sections include a time section between the specific time and a first time and another time section between the specific time and a second time, and wherein the specific time, the first time and the second time are different from each other.

* * * * *